(12) United States Patent
Roberson et al.

(10) Patent No.: US 9,494,032 B2
(45) Date of Patent: Nov. 15, 2016

(54) METHODS AND APPARATUS FOR EVALUATING DOWNHOLE CONDITIONS WITH RFID MEMS SENSORS

(71) Applicant: Halliburton Energy Services, Inc., Houston, TX (US)

(72) Inventors: Mark W. Roberson, Research Triangle Park, NC (US);
(Continued)

(73) Assignee: Halliburton Energy Services, Inc., Houston, TX (US)

( * ) Notice: Subject to any disclaimer, the term of this patent is extended or adjusted under 35 U.S.C. 154(b) by 322 days.

(21) Appl. No.: 14/145,524

(22) Filed: Dec. 31, 2013

(65) Prior Publication Data

US 2014/0111349 A1 Apr. 24, 2014

Related U.S. Application Data

(63) Continuation-in-part of application No. 13/031,519, filed on Feb. 21, 2011, which is a continuation-in-part
(Continued)

(51) Int. Cl.
*G01V 3/00* (2006.01)
*E21B 47/12* (2012.01)
(Continued)

(52) U.S. Cl.
CPC ............ *E21B 47/122* (2013.01); *E21B 33/13* (2013.01); *E21B 43/25* (2013.01);
(Continued)

(58) Field of Classification Search
CPC .................................................... E21B 47/122
(Continued)

(56) References Cited

U.S. PATENT DOCUMENTS 3,239,005 A    3/1966 Bodine, Jr.
3,930,220 A    12/1975 Shawhan
(Continued)

FOREIGN PATENT DOCUMENTS

EP    1241112 A2    9/2002
EP    1830035 A1    9/2007
(Continued)

OTHER PUBLICATIONS

"International Application Serial No. PCT/US2014/069699, International Search Report mailed Apr. 2, 2015", 3 pgs.
(Continued)

*Primary Examiner* — Amine Benlagsir
(74) *Attorney, Agent, or Firm* — Schwegman Lundberg & Woessner, P.A.; Craig W. Roddy

(57) ABSTRACT

A radio frequency identification (RFID) tag can include a die attached to an inductive-capacitive (LC) circuit including a capacitive element coupled to an inductive element. The LC circuit can have a resonant frequency that varies according to properties of fluid proximate the RFID tag. The RFID tag can further include a coating material disposed around the die to form an outer surface of the RFID tag. The coating material may have a thickness over a portion of the LC circuit, to permit a conductivity property of a fluid proximate the outer surface to affect the resonant frequency of the LC circuit such that the resonant frequency shifts to a second resonant frequency. Additional apparatus, systems, and methods are disclosed.

15 Claims, 9 Drawing Sheets

(72) Inventors: Craig W Roddy, Duncan, OK (US);
Charles Bartee, Research Triangle Park, NC (US); Kristopher McGuire, Research Triangle Park, NC (US); Krishna M Ravi, Kingwood, TX (US); Ginger Rothrock, Research Triangle Park, NC (US); Scott Goodwin, Research Triangle Park, NC (US)

Related U.S. Application Data of application No. 12/618,067, filed on Nov. 13, 2009, now Pat. No. 8,342,242, which is a continuation-in-part of application No. 11/695,329, filed on Apr. 2, 2007, now Pat. No. 7,712,527.

(51) Int. Cl.
| | | |
|---|---|---|
| *G06K 19/077* | (2006.01) | |
| *E21B 33/13* | (2006.01) | |
| *E21B 43/25* | (2006.01) | |
| *E21B 47/00* | (2012.01) | |
| *E21B 47/01* | (2012.01) | |
| *E21B 47/10* | (2012.01) | |

(52) U.S. Cl.
CPC ............ *E21B 47/0005* (2013.01); *E21B 47/01* (2013.01); *E21B 47/10* (2013.01); *G06K 19/07749* (2013.01)

(58) Field of Classification Search
USPC ................... 340/853.1, 854.3, 854.6, 854.8
See application file for complete search history.

(56) References Cited

U.S. PATENT DOCUMENTS

| | | | |
|---|---|---|---|
| 4,156,229 A | 5/1979 | Shawhan | |
| 4,234,344 A * | 11/1980 | Tinsley | C04B 28/04 |
| | | | 106/672 |
| 4,298,970 A | 11/1981 | Shawhan et al. | |
| 4,390,975 A | 6/1983 | Shawhan | |
| 4,412,934 A | 11/1983 | Chung et al. | |
| 4,512,401 A | 4/1985 | Bodine | |
| 4,552,674 A | 11/1985 | Brown et al. | |
| 4,653,587 A | 3/1987 | Bodine | |
| 4,701,247 A | 10/1987 | Kalnins et al. | |
| 4,736,794 A | 4/1988 | Bodine | |
| 5,121,795 A | 6/1992 | Ewert et al. | |
| 5,123,487 A | 6/1992 | Harris et al. | |
| 5,127,473 A | 7/1992 | Harris et al. | |
| 5,213,161 A | 5/1993 | King et al. | |
| 5,220,960 A | 6/1993 | Totten et al. | |
| 5,281,270 A | 1/1994 | Totten et al. | |
| 5,298,069 A | 3/1994 | King et al. | |
| 5,346,012 A | 9/1994 | Heathman et al. | |
| 5,437,329 A | 8/1995 | Brooks et al. | |
| 5,524,709 A | 6/1996 | Withers | |
| 5,588,488 A * | 12/1996 | Vijn | C04B 24/163 |
| | | | 106/724 |
| 5,627,749 A | 5/1997 | Waterman et al. | |
| 5,839,508 A | 11/1998 | Tubel et al. | |
| 5,991,602 A | 11/1999 | Sturm | |
| 5,995,477 A | 11/1999 | Smith et al. | |
| 6,041,861 A | 3/2000 | Mandal et al. | |
| 6,063,738 A * | 5/2000 | Chatterji | C04B 24/12 |
| | | | 106/603 |
| 6,101,447 A | 8/2000 | Poe, Jr. | |
| 6,125,935 A | 10/2000 | Shahin, Jr. | |
| 6,234,257 B1 | 5/2001 | Ciglenec et al. | |
| 6,241,028 B1 | 6/2001 | Bijleveld et al. | |
| 6,244,342 B1 | 6/2001 | Sullaway et al. | |
| 6,269,685 B1 | 8/2001 | Oden | |
| 6,324,904 B1 | 12/2001 | Ishikawa et al. | |
| 6,367,550 B1 * | 4/2002 | Chatterji | C04B 24/14 |
| | | | 106/646 |
| 6,374,913 B1 | 4/2002 | Robbins | |
| 6,429,784 B1 | 8/2002 | Beique et al. | |
| 6,434,084 B1 | 8/2002 | Schultz | |
| 6,443,228 B1 | 9/2002 | Aronstam et al. | |
| 6,457,524 B1 | 10/2002 | Roddy et al. | |
| 6,485,560 B1 | 11/2002 | Scherer et al. | |
| 6,547,871 B2 | 4/2003 | Chatterji et al. | |
| 6,597,175 B1 | 7/2003 | Brisco | |
| 6,664,215 B1 | 12/2003 | Tomlinson | |
| 6,693,554 B2 | 2/2004 | Beique et al. | |
| 6,697,738 B2 | 2/2004 | Ravi et al. | |
| 6,699,828 B1 | 3/2004 | de Buzzaccarini et al. | |
| 6,702,044 B2 | 3/2004 | Reddy et al. | |
| 6,712,138 B2 | 3/2004 | Mandal | |
| 6,722,433 B2 | 4/2004 | Brothers et al. | |
| 6,722,434 B2 | 4/2004 | Reddy et al. | |
| 6,735,630 B1 | 5/2004 | Gelvin et al. | |
| 6,745,833 B2 | 6/2004 | Aronstam et al. | |
| 6,766,141 B1 | 7/2004 | Briles et al. | |
| 6,775,578 B2 | 8/2004 | Couet et al. | |
| 6,789,619 B2 | 9/2004 | Carlson et al. | |
| 6,802,373 B2 | 10/2004 | Dillenbeck et al. | |
| 6,802,374 B2 | 10/2004 | Edgar et al. | |
| 6,817,412 B2 | 11/2004 | Haase | |
| 6,820,929 B2 | 11/2004 | Edrich et al. | |
| 6,823,271 B1 | 11/2004 | Foss | |
| 6,823,940 B2 | 11/2004 | Reddy et al. | |
| 6,834,722 B2 | 12/2004 | Vacik et al. | |
| 6,847,034 B2 | 1/2005 | Shah et al. | |
| 6,848,519 B2 | 2/2005 | Reddy et al. | |
| 6,864,215 B2 | 3/2005 | Dodwell et al. | |
| 6,891,477 B2 | 5/2005 | Aronstam | |
| 6,898,529 B2 | 5/2005 | Gao et al. | |
| 6,904,366 B2 | 6/2005 | Patzek et al. | |
| 6,915,848 B2 | 7/2005 | Thomeer et al. | |
| 6,920,929 B2 | 7/2005 | Bour | |
| 6,922,637 B2 | 7/2005 | Ravi et al. | |
| 6,925,392 B2 | 8/2005 | McNeil, III et al. | |
| 6,976,535 B2 | 12/2005 | Aronstam et al. | |
| 6,994,167 B2 | 2/2006 | Ramos et al. | |
| 6,995,677 B2 | 2/2006 | Aronstam et al. | |
| 7,003,405 B1 | 2/2006 | Ho | |
| 7,004,021 B2 | 2/2006 | Bilby et al. | |
| 7,036,363 B2 | 5/2006 | Yogeswaren | |
| 7,036,586 B2 | 5/2006 | Roddy et al. | |
| 7,038,470 B1 * | 5/2006 | Johnson | G01N 33/383 |
| | | | 250/390.05 |
| 7,040,404 B2 | 5/2006 | Brothers et al. | |
| 7,044,222 B2 * | 5/2006 | Tomlinson | C04B 9/02 |
| | | | 166/292 |
| 7,046,164 B2 | 5/2006 | Gao et al. | |
| 7,066,256 B2 | 6/2006 | Dillenbeck et al. | |
| 7,066,284 B2 | 6/2006 | Wylie et al. | |
| 7,077,203 B1 * | 7/2006 | Roddy | C04B 28/021 |
| | | | 106/707 |
| 7,082,993 B2 | 8/2006 | Ayoub et al. | |
| 7,104,116 B2 | 9/2006 | Discenzo | |
| 7,107,154 B2 | 9/2006 | Ward | |
| 7,116,542 B2 | 10/2006 | Lerche et al. | |
| 7,133,778 B2 | 11/2006 | Ravi et al. | |
| 7,140,434 B2 | 11/2006 | Chouzenoux et al. | |
| 7,140,437 B2 | 11/2006 | McMechan et al. | |
| 7,145,473 B2 | 12/2006 | Wisler et al. | |
| 7,152,466 B2 | 12/2006 | Ramakrishnan et al. | |
| 7,156,174 B2 | 1/2007 | Roddy et al. | |
| 7,174,962 B1 * | 2/2007 | Roddy | C04B 28/021 |
| | | | 106/672 |
| 7,213,647 B2 | 5/2007 | Brothers et al. | |
| 7,225,879 B2 | 6/2007 | Wylie et al. | |
| 7,303,014 B2 | 12/2007 | Reddy et al. | |
| 7,315,248 B2 | 1/2008 | Egbert | |
| 7,357,181 B2 | 4/2008 | Webb | |
| 7,389,819 B2 | 6/2008 | Oyeneyin et al. | |
| 7,392,697 B2 | 7/2008 | Chikenji et al. | |
| 7,400,262 B2 | 7/2008 | Chemali et al. | |
| 7,434,457 B2 | 10/2008 | Goodwin et al. | |
| 7,455,108 B2 | 11/2008 | Jenkins et al. | |

(56) References Cited

U.S. PATENT DOCUMENTS

| | | | |
|---|---|---|---|
| 7,461,547 B2 | 12/2008 | Terabayashi et al. | |
| 7,482,309 B2 | 1/2009 | Ravi et al. | |
| 7,493,962 B2 | 2/2009 | Sheffield | |
| 7,543,642 B2 | 6/2009 | Reddy et al. | |
| 7,581,434 B1 | 9/2009 | Discenzo et al. | |
| 7,617,879 B2 | 11/2009 | Anderson et al. | |
| 7,631,697 B2 | 12/2009 | Bhavsar | |
| 7,636,671 B2 | 12/2009 | Caveny et al. | |
| 7,647,979 B2 | 1/2010 | Shipley | |
| 7,673,679 B2 | 3/2010 | Harrison et al. | |
| 7,712,527 B2 | 5/2010 | Roddy | |
| 7,717,180 B2 | 5/2010 | Badalamenti et al. | |
| 7,749,942 B2 | 7/2010 | Ravi et al. | |
| 7,750,808 B2 | 7/2010 | Masino et al. | |
| 7,784,339 B2 | 8/2010 | Cook et al. | |
| 7,832,263 B2 | 11/2010 | Rensel et al. | |
| 7,866,393 B2 | 1/2011 | Badalamenti et al. | |
| 7,878,245 B2 | 2/2011 | Ravi et al. | |
| 8,162,050 B2 | 4/2012 | Roddy et al. | |
| 8,168,570 B2 | 5/2012 | Barron et al. | |
| 8,202,824 B2 | 6/2012 | Reddy et al. | |
| 8,291,975 B2 | 10/2012 | Roddy et al. | |
| 8,297,352 B2 | 10/2012 | Roddy et al. | |
| 8,297,353 B2 | 10/2012 | Roddy et al. | |
| 8,302,686 B2 | 11/2012 | Roddy et al. | |
| 8,316,936 B2 | 11/2012 | Roddy et al. | |
| 8,316,963 B2 | 11/2012 | Eia et al. | |
| 8,342,242 B2 | 1/2013 | Roddy et al. | |
| 8,436,743 B2 | 5/2013 | Auzerais et al. | |
| 9,194,207 B2 | 11/2015 | Roddy et al. | |
| 2002/0046147 A1 | 4/2002 | Livesay et al. | |
| 2002/0091071 A1 | 7/2002 | Fischer et al. | |
| 2002/0145526 A1* | 10/2002 | Friedman | A61B 5/0002 340/573.5 |
| 2002/0194906 A1 | 12/2002 | Goodwin et al. | |
| 2002/0196993 A1 | 12/2002 | Schroeder | |
| 2003/0029611 A1 | 2/2003 | Owens | |
| 2003/0205376 A1 | 11/2003 | Ayoub et al. | |
| 2004/0020643 A1 | 2/2004 | Thomeer et al. | |
| 2004/0047534 A1 | 3/2004 | Shah et al. | |
| 2004/0083805 A1 | 5/2004 | Ramakrishnan et al. | |
| 2004/0098202 A1 | 5/2004 | McNeil, II et al. | |
| 2004/0180793 A1 | 9/2004 | Ramos | |
| 2004/0242430 A1 | 12/2004 | Griffin et al. | |
| 2005/0006020 A1 | 1/2005 | Zitha et al. | |
| 2005/0011645 A1 | 1/2005 | Aronstam et al. | |
| 2005/0016730 A1 | 1/2005 | McMechan et al. | |
| 2005/0055162 A1 | 3/2005 | Gao et al. | |
| 2005/0159494 A1 | 7/2005 | Dobbs | |
| 2005/0207279 A1 | 9/2005 | Chemali et al. | |
| 2005/0224123 A1 | 10/2005 | Baynham et al. | |
| 2006/0013065 A1 | 1/2006 | Varsamis et al. | |
| 2006/0047527 A1 | 3/2006 | Caveny et al. | |
| 2006/0086503 A1 | 4/2006 | Reddy et al. | |
| 2006/0170535 A1 | 8/2006 | Watters et al. | |
| 2006/0250243 A1 | 11/2006 | Masino et al. | |
| 2006/0279412 A1 | 12/2006 | Holland et al. | |
| 2007/0044572 A1 | 3/2007 | Davis et al. | |
| 2007/0062695 A1 | 3/2007 | Harrison et al. | |
| 2007/0090927 A1* | 4/2007 | Potyrailo | G06K 19/0717 340/10.41 |
| 2007/0131414 A1 | 6/2007 | Calderoni et al. | |
| 2008/0007421 A1 | 1/2008 | Liu et al. | |
| 2008/0068209 A1 | 3/2008 | Sugiyama et al. | |
| 2008/0125335 A1 | 5/2008 | Bhavsar | |
| 2008/0196889 A1 | 8/2008 | Bour et al. | |
| 2008/0236814 A1 | 10/2008 | Roddy | |
| 2008/0272931 A1 | 11/2008 | Auzerais et al. | |
| 2008/1030787 | 12/2008 | Cook et al. | |
| 2009/0022011 A1 | 1/2009 | Mickael et al. | |
| 2009/0033516 A1 | 2/2009 | Alteirac et al. | |
| 2009/0107666 A1 | 4/2009 | Tchakarov et al. | |
| 2009/0120168 A1 | 5/2009 | Harrison et al. | |
| 2009/0288820 A1 | 11/2009 | Barron et al. | |
| 2010/0039898 A1 | 2/2010 | Gardner et al. | |
| 2010/0050905 A1 | 3/2010 | Lewis et al. | |
| 2010/0051266 A1 | 3/2010 | Roddy et al. | |
| 2010/0051275 A1 | 3/2010 | Lewis et al. | |
| 2010/0102986 A1 | 4/2010 | Benischek et al. | |
| 2010/0139386 A1 | 6/2010 | Taylor | |
| 2010/0212891 A1 | 8/2010 | Stewart et al. | |
| 2011/0187556 A1 | 8/2011 | Roddy et al. | |
| 2011/0199228 A1* | 8/2011 | Roddy | E21B 33/13 340/856.4 |
| 2011/0315377 A1 | 12/2011 | Rioufol | |
| 2012/0055669 A1 | 3/2012 | Levin et al. | |
| 2012/0055998 A1* | 3/2012 | Mieslinger | G06K 19/07749 235/492 |
| 2012/0056504 A1* | 3/2012 | Hunter | H01L 37/02 310/306 |
| 2012/0132418 A1 | 5/2012 | Mcclung, III et al. | |
| 2012/0205103 A1 | 8/2012 | Ravi et al. | |
| 2012/0273192 A1 | 11/2012 | Schmidt et al. | |
| 2013/0062068 A1 | 3/2013 | Roddy et al. | |
| 2013/0141220 A1 | 6/2013 | Sadr et al. | |
| 2013/0147608 A1 | 6/2013 | Sadr | |
| 2014/0174732 A1 | 6/2014 | Goodwin et al. | |

FOREIGN PATENT DOCUMENTS

| | | |
|---|---|---|
| EP | 2129867 A1 | 12/2009 |
| EP | 2336487 A1 | 6/2011 |
| EP | 2343434 A1 | 7/2011 |
| EP | 2489828 A1 | 8/2012 |
| EP | 2129867 B1 | 8/2013 |
| GB | 2367133 A | 3/2002 |
| GB | 2391565 A | 2/2004 |
| GB | 2431400 A | 4/2007 |
| JP | 2008-541616 A | 11/2008 |
| WO | WO-99/20722 A2 | 4/1999 |
| WO | WO-99/66172 A1 | 12/1999 |
| WO | WO-02/06628 A1 | 1/2002 |
| WO | WO-2006/136635 A2 | 12/2006 |
| WO | WO-2006/136635 A3 | 12/2006 |
| WO | WO-2007/034273 A1 | 3/2007 |
| WO | WO-2008/119963 A1 | 10/2008 |
| WO | WO-2009/008735 A1 | 1/2009 |
| WO | WO-2011/023938 A1 | 3/2011 |
| WO | WO-2011/023938 A9 | 3/2011 |
| WO | WO-2011/023942 A2 | 3/2011 |
| WO | WO-2011/023942 A3 | 3/2011 |
| WO | WO-2011/058324 A1 | 5/2011 |
| WO | WO-2012/114068 A2 | 8/2012 |
| WO | WO-2014/007878 A1 | 1/2014 |
| WO | WO-2015/102838 A1 | 7/2015 |
| WO | WO-2015/199986 A1 | 12/2015 |
| WO | WO-2016/032677 A1 | 3/2016 |

OTHER PUBLICATIONS

"International Application Serial No. PCT/US2014/069699, Written Opinion mailed Apr. 2, 2015", 13 pgs.

Ong, K. G., et al., "Design and application of a wireless, passive, resonant-circuit environmental monitoring sensor", *Sensors and Actuators A; Physical*, (Aug. 2001), 33-43.

Ong, , Keat G., et al., "A Wireless, Passive Carbon Nanotuhe-Based Gas Sensor", *IEEE Sensors Journal*, 2(2), (Apr. 2002). 82-88.

"U.S. Appl. No. 11/695,329, Advisory Action mailed Feb. 24, 2010", 3 pgs.

"U.S. Appl. No. 11/695,329, Amendments and Response filed Jan. 21, 2010 to Final Office Action mailed Jan. 15, 2010", 17 pgs.

"U.S. Appl. No. 11/695,329, Amendments and Response filed Feb. 5, 2010 to Final Office Action mailed Jan. 15, 2010 and Advisory Action mailed Jan. 28, 2010", 17 pgs.

"U.S. Appl. No. 11/695,329, Amendments and Response filed Feb. 26, 2010 to Final Office Action mailed Jan. 15, 2010 and Advisory Actions mailed Jan. 28, 2010 and Feb. 24, 2010", 17 pgs.

"U.S. Appl. No. 11/695,329, Amendments and Response filed Jul. 8, 2009 to Non-Final Office Action mailed May 14, 2009", 15 pgs.

"U.S. Appl. No. 11/695,329, Amendments and Response filed Nov. 4, 2009 to Non-Final Office Action mailed Oct. 29, 2009", 14 pgs.

(56) References Cited

OTHER PUBLICATIONS

"U.S. Appl. No. 11/695,329, Final Office Action mailed Jan. 15, 2010", 7 pgs.
"U.S. Appl. No. 11/695,329, Non-Final Office Action mailed May 14, 2009", 6 pgs.
"U.S. Appl. No. 11/695,329, Non-Final Office Action mailed Oct. 29, 2009", 5 pgs.
"U.S. Appl. No. 11/695,329, Notice of Allowance mailed Mar. 12, 2010", 4 pgs.
"U.S. Appl. No. 12/618,067, Amemdments and Response to Final Office Action mailed Aug. 15, 2012", 12 pgs.
"U.S. Appl. No. 12/618,067, Amendments and Response filed Jun. 11, 2012 to Non-Final Office Action mailed Mar. 9, 2012", 11 pgs.
"U.S. Appl. No. 12/618,067, Final Office Action mailed Aug. 15, 2012", 6 pgs.
"U.S. Appl. No. 12/618,067, Non-Final Office Action mailed Mar. 9, 2012", 5 pgs.
"U.S. Appl. No. 12/618,067, Notice of Allowance mailed Oct. 9, 2012", 5 pgs.
"U.S. Appl. No. 12/618,067, Notice of Allowance mailed Nov. 19, 2012", 7 pgs.
"U.S. Appl. No. 13/031,519, Amendments and Response filed Apr. 4, 2014 to Non-Final Office Action mailed Jan. 29, 2014", 8 pgs.
"U.S. Appl. No. 13/031,519, Final Office Action mailed Feb. 3, 2016", 25 pgs.
"U.S. Appl. No. 13/031,519, Non-Final Office Action mailed Feb. 24, 2015", 33 pgs.
"U.S. Appl. No. 13/031,519, Response filed Apr. 14, 2016 to Final Office Action mailed Feb. 3, 2016", 12 pgs.
"U.S. Appl. No. 13/031,519, Amendment, Response and RCE filed Jun. 25, 2015 to Final Office Action mailed Apr. 9, 2015", 14 pgs.
"U.S. Appl. No. 13/031,519, Amendments and Response filed Nov. 5, 2014 to Non-Final Office Action mailed Aug. 5, 2014", 12 pgs.
"U.S. Appl. No. 13/031,519, Final Office Action mailed Apr. 9, 2015", 24 pgs.
"U.S. Appl. No. 13/031,519, Non-Final Office Action mailed Jan. 29, 2014", 19 pgs.
"U.S. Appl. No. 13/031,519, Non-Final Office Action mailed Apr. 20, 2016", 25 pgs.
"U.S. Appl. No. 13/031,519, Non-Final Office Action mailed Aug. 5, 2014", 31 pgs.
"U.S. Appl. No. 13/031,519, Non-Final Office Action mailed Aug. 27, 2014", 25 pgs.
"U.S. Appl. No. 13/031,519, Response filed Nov. 6, 2015 to Non-Final Office Action mailed Aug. 27, 2015", 15 pgs.
"U.S. Appl. No. 13/031,524, Amendments and Response filed Jun. 11, 2012 to Non-Final Office Action mailed Mar. 9, 2012", 10 pgs.
"U.S. Appl. No. 13/031,524, Non-Final Office Action mailed Mar. 9, 2012", 5 pgs.
"U.S. Appl. No. 13/031,524, Notice of Allowance mailed Sep. 11, 2012", 5 pgs.
"U.S. Appl. No. 13/031,527, Amendments and Response filed Jun. 12, 2012 to Non-Final Office Action mailed Mar. 12, 2012", 8 pgs.
"U.S. Appl. No. 13/031,527, Non-Final Office Action mailed Mar. 12, 2012", 5 pgs.
"U.S. Appl. No. 13/031,527, Notice of Allowance mailed Aug. 29, 2012", 5 pgs.
"U.S. Appl. No. 13/031,535, Amendments and Response filed Jun. 12, 2012 to Non-Final Office Action mailed Mar. 12, 2012", 8 pgs.
"U.S. Appl. No. 13/031,535, Non-Final Office Action mailed Mar. 12, 2012", 5 pgs.
"U.S. Appl. No. 13/031,535, Notice of Allowance mailed Oct. 9, 2012", 7 pgs.
"U.S. Appl. No. 13/031,536, Amendments and Response filed Jun. 13, 2012 to Non-Final Office Action mailed Mar. 13, 2012", 8 pgs.
"U.S. Appl. No. 13/031,536, Non-Final Office Action mailed Mar. 13, 2012", 5 pgs.
"U.S. Appl. No. 13/031,536, Notice of Allowance mailed Aug. 17, 2012", 5 pgs.
"U.S. Appl. No. 13/031,536, Notice of Allowance mailed Sep. 18, 2012", 7 pgs.
"U.S. Appl. No. 13/031,539, Amendments and Response filed Jun. 13, 2012 to Non-Final Office Action mailed Mar. 14, 2012", 7 pgs.
"U.S. Appl. No. 13/031,539, Non-Final Office Action mailed Mar. 14, 2012", 4 pgs.
"U.S. Appl. No. 13/031,539, Notice of Allowance mailed Aug. 16, 2012", 5 pgs.
"European Application Serial No. 08718914.8, Amended Claims filed Mar. 28, 2012 in response to Minutes of Consultation mailed Mar. 6, 2012", 7 pgs.
"European Application Serial No. 08718914.8, European Office Action mailed May 31, 2011", 4 pgs.
"European Application Serial No. 08718914.8, Office Action mailed May 4, 2010", 5 pgs.
"European Application Serial No. 08718914.8, Office Action mailed May 31, 2011", 3 pgs.
"European Application Serial No. 08718914.8, Resonse filed Nov. 15, 2010 to Office Action mailed May 4, 2010", 10 pgs.
"European Application Serial. No. 08718914.8, Response mailed Dec. 12, 2011 to Office Action mailed May 31, 2011", 13 pgs.
"European Application Serial No. 08718914.8, Result of Consultation mailed Mar. 6, 2012", 2 pgs.
"European Application Serial No. 11159483.4, European Search Report mailed May 19, 2011", 5 pgs.
"European Application Serial No. 11159483.4, Notice of Loss of Rights mailed Feb. 17, 2012", 1 pg.
"European Application Serial No. 11159483.4, Office Action mailed Jul. 16, 2012", 4 pgs.
"European Application Serial No. 11159483.4, Office Action mailed Sep. 13, 2013", 4 pgs.
"European Application Serial No. 11159483.4, Office Action mailed Nov. 26, 2014", 4 pgs.
"European Application Serial No. 11159483.4, Reply filed Jan. 28, 2013 to Office Action mailed Jul. 16, 2012", 11 pgs.
"European Application Serial No. 11159483.4, Reply filed Feb. 26, 2014 to Office Action mailed Sep. 13, 2013", 11 pgs.
"European Application Serial No. 11159483.4, Reply filed Apr. 26, 2012 to Notice of Loss of Rights mailed Feb. 17, 2012", 13 pgs.
"European Application Serial No. 11159483.4, Reply filed Jun. 4, 2015 to Office Action mailed Nov. 26, 2014", 62 pgs.
"European Application Serial No. 11159484.2, European Search Report mailed May 19, 2011", 4 pgs.
"European Application Serial No. 11159484.2, Notice of Loss of Rights mailed Jan. 27, 2012", 1 pg.
"European Application Serial No. 11159484.2, Office Action mailed May 14, 2012", 3 pgs.
"European Application Serial No. 11159484.2, Reply filed Apr. 5, 2012 to Notice of Loss of Rights mailed Jan. 27, 2012", 13 pgs.
"European Application Serial No. 11159484.2, Reply filed Nov. 29, 2012 to Office Action mailed May 14, 2012 and Telephone Consultation dated Oct. 19, 2012", 11 pgs.
"European Application Serial No. 11159484.2, Result of Consultation mailed Oct. 19, 2012", 4 pgs.
"European Application Serial No. 12167946.8, European Search Report mailed Jul. 6, 2012", 6 pgs.
"European Application Serial No. 12167946.8, Office Action mailed Sep. 20, 2013", 3 pgs.
"European Application Serial No. 12167946.8, Office Action mailed Nov. 26, 2015", 4 pgs.
"European Application Serial No. 12167946.8, Office Action mailed Nov. 27, 2014", 4 pgs.
"European Application Serial No. 12167946.8, Reply filed Jan. 22, 2014 to Office Action mailed Sep. 20, 2013", 10 pgs.
"European Application Serial No. 12167946.8, Reply filed Mar. 24, 2016 to Office Action mailed Nov. 26, 2015", 2 pgs.
"European Application Serial No. 12167946.8, Reply filed Jun. 8, 2015 to Office Action mailed Nov. 27, 2014", 65 pgs.
"European Application Serial No. 12167947.6, Reply filed Feb. 21, 2013 to Supplementary European Search Report mailed Jul. 6, 2012", 3 pgs.
"European Application Serial No. 12167947.6, Supplementary European Search Report mailed Jul. 6, 2012", 6 pgs.

(56) References Cited

OTHER PUBLICATIONS

"Haliburton Fluid Systems," Cementing Spherelite trn-Cement Additive, HO1516, (Nov. 2006), 1 pg.

"International Application Serial No. PCT/GB2008/000179, International Preliminary Report on Patentability dated Jul. 28, 2009", 10 pgs.

"International Application Serial No. PCT/GB2008/000179, International Search Report and Written Opinion mailed May 30, 2008", 12 pgs.

"International Application Serial No. PCT/GB2008/001084, International Preliminary Report on Patentability dated Oct. 6, 2009", 7 pgs.

"International Application Serial No. PCT/GB2008/001084, International Search Report and Written Opinion mailed Jul. 8, 2008", 9 pgs.

"International Application Serial No. PCT/GB2010001580, International Preliminary Report on Patentability mailed Mar. 8, 2012", 7 pgs.

"International Application Serial No. PCT/GB2010001580, International Search Report and Written Opinion mailed Apr. 21, 2011", 9 pgs.

"International Application Serial No. PCT/GB2010001590, International Preliminary Report on Patentability mailed Mar. 8, 2012", 7 pgs.

"International Application Serial No. PCT/GB2010001590, International Search Report and Written Opinion mailed Apr. 21, 2011", 9 pgs.

"International Application Serial No. PCT/GB2010002089, International Preiminary Report on Patentability mailed May 24, 2012", 7 pgs.

"International Application Serial No. PCT/GB2010002089, International Search Report and Written Opinion mailed Apr. 21, 2011", 9 pgs.

"International Application Serial No. PCT/GB2012/000179, International Preiminary Report on Patentability mailed Aug. 29, 2013", 9 pgs.

"International Application Serial No. PCT/GB2012/000179, International Search Report and Written Opinion mailed Jun. 24, 2013", 11 pgs.

"International Application Serial No. PCT/US2015/035090, International Search Report mailed Aug. 31, 2015", 4 pgs.

"International Application Serial No. PCT/US2015/035090, Written Opinion mailed Aug. 31, 2015", 7 pgs.

"International Application Serial No. PCT/US2015/042866, International Search Report mailed Oct. 23, 2015", 3 pgs.

"International Application Serial No. PCT/US2015/042866, Written Opinion mailed Oct. 23, 2015", 13 pgs.

"International Road Dynamics Inc.," Concrete Maturity Monitor: Wireless Technonlogy in the Palm of Your Hand, REVA, Canada, (Jun. 2002), 5 pgs.

"MEMS Concrete Monitoring System", [online]. © Advanced Design Consulting USA, Inc., [archived on Jun. 25, 2006]. Retrieved from the Internet: <URL: https://web.archive.org/web/20060625101655/http://adc9001.com/index.php?src=memsconcrete&print=1, (2006), 1 pg.

"Ultrasonic Testing of Aerospace Materials", NASA Practice No. PT-TE-1422 [online]. [archived on Sep. 14, 2012]. Retrieved from the Internet: <URL: https://web.archive.org/web/20120914030843/http://www.klabs.org/DEI/References/design_guidelines/test_series/1422msfc.pdf>, (2012), 6 pgs.

Drumheller, D. S., "An overview of acoustic telemetry", (1992), 7 pgs.

Ravi, Kris, et al., "Cementing Process Optimized to Achieve Zonal Isolation", *Petrotech*, (2007), 6 pgs.

\* cited by examiner

METHODS AND APPARATUS FOR EVALUATING DOWNHOLE CONDITIONS WITH RFID MEMS SENSORS

CROSS-REFERENCE TO RELATED APPLICATIONS

This is a continuation-in-part application of U.S. patent application Ser. No. 13/031,519, filed Feb. 21, 2011, published as U.S. Patent Application Publication 2011/0199228; which is a continuation-in-part application of U.S. patent application Ser. No. 12/618,067, filed on Nov. 13, 2009, now U.S. Pat. No. 8,342,242, which is a continuation-in-part of U.S. patent application Ser. No. 11/695,329, now U.S. Pat. No. 7,712,527, all entitled "Use of Micro-Electro-Mechanical Systems (MEMS) in Well Treatments," each of which is hereby incorporated by reference herein in its entirety, and for all purposes.

BACKGROUND OF THE INVENTION

This disclosure relates to the field of drilling, completing, servicing, and treating a subterranean well such as a hydrocarbon recovery well. In particular, the present disclosure relates to systems and methods for detecting properties of wellbore servicing fluids based on the responses that these properties can generate in RFID tags, in some cases having associated MEMS-based data sensors.

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. Non-cementitious sealants are also utilized in preparing a wellbore. For example, polymer, resin, or latex-based sealants may be desirable for placement behind casing.

To enhance the life of the well and minimize costs, sealant slurries are chosen based on calculated stresses and characteristics of the formation to be serviced. Suitable sealants are selected based on the conditions that are expected to be encountered during the sealant service life. Once a sealant is chosen, it is desirable to monitor and/or evaluate the health of the sealant so that timely maintenance can be performed and the service life maximized. The integrity of sealant can be adversely affected by conditions in the well. For example, cracks in cement may allow water influx while acid conditions may degrade cement. The initial strength and the service life of cement can be significantly affected by its moisture content from the time that it is placed. Moisture and temperature are the primary drivers for the hydration of many cements and are critical factors in the most prevalent deteriorative processes, including damage due to freezing and thawing, alkali-aggregate reaction, sulfate attack and delayed Ettringite (hexacalcium aluminate trisulfate) formation. Thus, it is desirable to measure one or more sealant parameters (e.g., moisture content, temperature, pH and ion concentration) in order to monitor sealant integrity.

Active, embeddable sensors can involve drawbacks that make them undesirable for use in a wellbore environment. For example, low-powered (e.g., nanowatt) electronic moisture sensors are available, but have inherent limitations when embedded within cement. The highly alkali environment can damage their electronics, and they are sensitive to electromagnetic noise. Additionally, power must be provided from an internal battery to activate the sensor and transmit data, which increases sensor size and decreases useful life of the sensor. Accordingly, an ongoing need exists for improved methods of monitoring wellbore sealant condition from placement through the service lifetime of the sealant.

Likewise, in performing wellbore servicing operations, an ongoing need exists for improvements related to monitoring and/or detecting a condition and/or location of a wellbore, formation, wellbore servicing tool, wellbore servicing fluid, or combinations thereof. Such needs may be met by the systems and methods for use of radio frequency identification (RFID) tags, in some cases with MEMS sensors, down hole in accordance with the various embodiments described herein.

DETAILED DESCRIPTION

Figure 1:
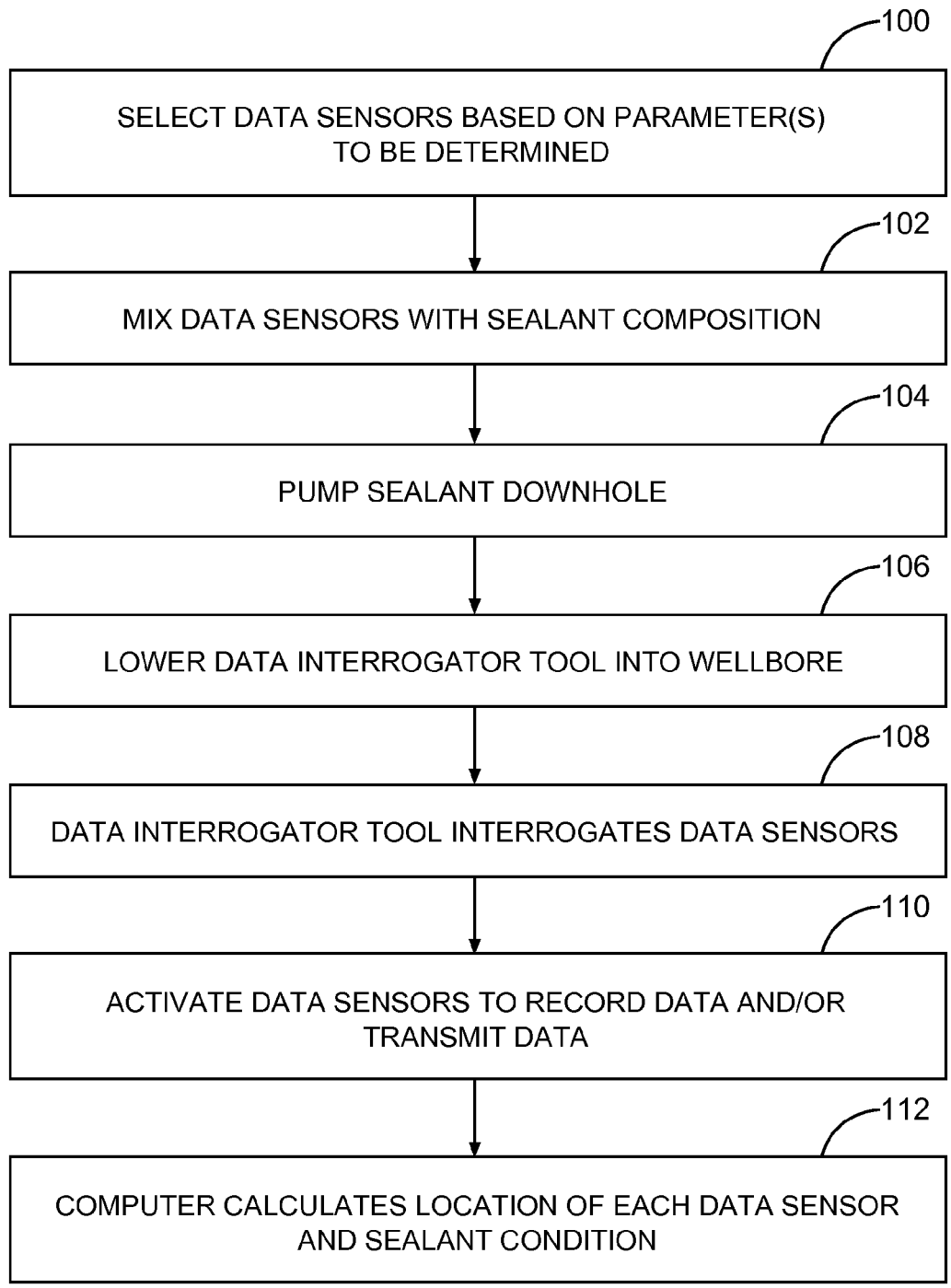
FIG. 1 is a flow chart illustrating a method in accordance with some embodiments.

Disclosed herein are methods for detecting and/or monitoring the position and/or condition of a wellbore, a formation, a wellbore service tool, and/or wellbore compositions, for example wellbore sealants such as cement, using MEMS-based data sensors. Still more particularly, the present disclosure describes methods of monitoring the integrity and performance of wellbore compositions over the life of the well using MEMS-based data sensors. Performance may be indicated by changes, for example, in various parameters, including, but not limited to, moisture content, temperature, pH, and various ion concentrations (e.g., sodium, chloride, and potassium ions) of the cement. In embodiments, the methods comprise the use of embeddable data sensors capable of detecting parameters in a wellbore composition, for example a sealant such as cement. In embodiments, the methods provide for evaluation of sealant during mixing, placement, and/or curing of the sealant within the wellbore. In another embodiment, the method is used for sealant evaluation from placement and curing throughout its useful service life, and where applicable to a period of deterioration and repair. In embodiments, the methods of this disclosure may be used to prolong the service life of the sealant, lower costs, and enhance creation of improved methods of remediation. Additionally, methods are disclosed for determining the location of sealant within a wellbore, such as for determining the location of a cement slurry during primary cementing of a wellbore as discussed further hereinbelow. Additional embodiments and methods for employing MEMS-based data sensors in a wellbore are described herein.

The methods disclosed herein comprise the use of various wellbore compositions, including sealants and other wellbore servicing fluids. As used herein, "wellbore composition" includes any composition that may be prepared or otherwise provided at the surface and placed down the wellbore, typically by pumping. As used herein, a "sealant" refers to a fluid used to secure components within a wellbore or to plug or seal a void space within the wellbore. Sealants, and in particular cement slurries and non-cementitious compositions, are used as wellbore compositions in several embodiments described herein, and it is to be understood that the methods described herein are applicable for use with other wellbore compositions. As used herein, "servicing fluid" refers to a fluid used to drill, complete, work over, fracture, repair, treat, or in any way prepare or service a wellbore for the recovery of materials residing in a subterranean formation penetrated by the wellbore. Examples of servicing fluids include, but are not limited to, cement slurries, non-cementitious sealants, drilling fluids or muds, spacer fluids, fracturing fluids or completion fluids, all of which are well known in the art. While fluid is generally understood to encompass material in a pumpable state, reference to a wellbore servicing fluid that is settable or curable (e.g., a sealant such as cement) includes, unless otherwise noted, the fluid in a pumpable and/or set state, as would be understood in the context of a given wellbore servicing operation. Generally, wellbore servicing fluid and wellbore composition may be used interchangeably unless otherwise noted. The servicing fluid is for use in a wellbore that penetrates a subterranean formation. It is to be understood that "subterranean formation" encompasses both areas below exposed earth and areas below earth covered by water such as ocean or fresh water. The wellbore may be a substantially vertical wellbore and/or may contain one or more lateral wellbores, for example as produced via directional drilling. As used herein, components are referred to as being "integrated" if they are formed on a common support structure placed in packaging of relatively small size, or otherwise assembled in close proximity to one another.

Discussion of an embodiment of the method of the present disclosure will now be made with reference to the flowchart of FIG. 1, which includes methods of placing MEMS sensors in a wellbore and gathering data. At block 100, data sensors are selected based on the parameter(s) or other conditions to be determined or sensed within the wellbore.

At block 102, a quantity of data sensors is mixed with a wellbore composition, for example a sealant slurry. In embodiments, data sensors are added to a sealant by any methods known to those of skill in the art. For example, the sensors may be mixed with a dry material, mixed with one more liquid components (e.g., water or a non-aqueous fluid), or combinations thereof. The mixing may occur onsite, for example addition of the sensors into a bulk mixer such as a cement slurry mixer. The sensors may be added directly to the mixer, may be added to one or more component streams and subsequently fed to the mixer, may be added downstream of the mixer, or combinations thereof. In embodiments, data sensors are added after a blending unit and slurry pump, for example, through a lateral by-pass. The sensors may be metered in and mixed at the well site, or may be pre-mixed into the composition (or one or more components thereof) and subsequently transported to the well site. For example, the sensors may be dry mixed with dry cement and transported to the well site where a cement slurry is formed comprising the sensors. Alternatively or additionally, the sensors may be pre-mixed with one or more liquid components (e.g., mix water) and transported to the well site where a cement slurry is formed comprising the sensors. The properties of the wellbore composition or components thereof may be such that the sensors distributed or dispersed therein do not substantially settle during transport or placement.

The wellbore composition, e.g., sealant slurry, is then pumped downhole at block 104, whereby the sensors are positioned within the wellbore. For example, the sensors may extend along all or a portion of the length of the wellbore adjacent the casing. The sealant slurry may be placed downhole as part of a primary cementing, secondary cementing, or other sealant operation as described in more detail herein. At block 106, a data interrogation tool (also referred to as a data interrogator tool, data interrogator, interrogator, interrogation/communication tool or unit, or the like) is positioned in an operable location to gather data from the sensors, for example lowered or otherwise placed within the wellbore proximate the sensors. In various embodiments, one or more data interrogators may be placed downhole (e.g., in a wellbore) prior to, concurrent with, and/or subsequent to placement in the wellbore of a wellbore composition comprising MEMS sensors. At block 108, the data interrogation tool interrogates the data sensors (e.g., by sending out an RF signal) while the data interrogation tool traverses all or a portion of the wellbore containing the sensors. The data sensors are activated to record and/or transmit data at block 110 via the signal from the data interrogation tool. At block 112, the data interrogation tool communicates the data to one or more computer components (e.g., memory and/or microprocessor) that may be located within the tool, at the surface, or both. The data may be used locally or remotely from the tool to calculate the location of each data sensor and correlate the measured parameter(s) to such locations to evaluate sealant performance. Accordingly, the data interrogation tool comprises MEMS sensor interrogation functionality, communication functionality (e.g., transceiver functionality), or both.

Data gathering, as shown in blocks 106 to 112 of FIG. 1, may be carried out at the time of initial placement in the well of the wellbore composition comprising MEMS sensors, for example during drilling (e.g., drilling fluid comprising MEMS sensors) or during cementing (e.g., cement slurry comprising MEMS sensors) as described in more detail below. Additionally or alternatively, data gathering may be carried out at one or more times subsequent to the initial placement in the well of the wellbore composition comprising MEMS sensors. For example, data gathering may be carried out at the time of initial placement in the well of the wellbore composition comprising MEMS sensors or shortly thereafter to provide a baseline data set. As the well is operated for recovery of natural resources over a period of time, data gathering may be performed additional times, for example at regular maintenance intervals such as every 1 year, 5 years, or 10 years. The data recovered during subsequent monitoring intervals can be compared to the baseline data as well as any other data obtained from previous monitoring intervals, and such comparisons may indicate the overall condition of the wellbore. For example, changes in one or more sensed parameters may indicate one or more problems in the wellbore. Alternatively, consistency or uniformity in sensed parameters may indicate no substantive problems in the wellbore. The data may comprise any combination of parameters sensed by the MEMS sensors as present in the wellbore, including but not limited to temperature, pressure, ion concentration, stress, strain, gas concentration, etc. In an embodiment, data regarding performance of a sealant composition includes cement slurry properties such as density, rate of strength development, thickening time, fluid loss, and hydration properties; plasticity parameters; compressive strength; shrinkage and expansion characteristics; mechanical properties such as Young's Modulus and Poisson's ratio; tensile strength; resistance to ambient conditions downhole such as temperature and chemicals present; or any combination thereof, and such data may be evaluated to determine long term performance of the sealant composition (e.g., detect an occurrence of radial cracks, shear failure, and/or de-bonding within the set sealant composition) in accordance with embodiments set forth in K. Ravi and H. Xenakis, "Cementing Process Optimized to Achieve Zonal Isolation," presented at PETROTECH-2007 Conference, New Delhi, India, which is incorporated herein by reference in its entirety. In an embodiment, data (e.g., sealant parameters) from a plurality of monitoring intervals is plotted over a period of time, and a resultant graph is provided showing an operating or trend line for the sensed parameters. Atypical changes in the graph as indicated for example by a sharp change in slope or a step change on the graph may provide an indication of one or more present problems or the potential for a future problem. Accordingly, remedial and/or preventive treatments or services may be applied to the wellbore to address present or potential problems.

In embodiments, the MEMS sensors are contained within a sealant composition placed substantially within the annular space between a casing and the wellbore wall. That is, substantially all of the MEMS sensors are located within or in close proximity to the annular space. In an embodiment, the wellbore servicing fluid comprising the MEMS sensors (and thus likewise the MEMS sensors) does not substantially penetrate, migrate, or travel into the formation from the wellbore. In an alternative embodiment, substantially all of the MEMS sensors are located within, adjacent to, or in close proximity to the wellbore, for example less than or equal to about 1 foot, 3 feet, 5 feet, or 10 feet from the wellbore. Such adjacent or close proximity positioning of the MEMS sensors with respect to the wellbore is in contrast to placing MEMS sensors in a fluid that is pumped into the formation in large volumes and substantially penetrates, migrates, or travels into or through the formation, for example as occurs with a fracturing fluid or a flooding fluid. Thus, in embodiments, the MEMS sensors are placed proximate or adjacent to the wellbore (in contrast to the formation at large), and provide information relevant to the wellbore itself and compositions (e.g., sealants) used therein (again in contrast to the formation or a producing zone at large). In alternative embodiments, the MEMS sensors are distributed from the wellbore into the surrounding formation (e.g., additionally or alternatively non-proximate or non-adjacent to the wellbore), for example as a component of a fracturing fluid or a flooding fluid described in more detail herein.

In embodiments, the sealant is any wellbore sealant known in the art. Examples of sealants include cementitious and non-cementitious sealants both of which are well known in the art. In embodiments, non-cementitious sealants comprise resin based systems, latex based systems, or combinations thereof. In embodiments, the sealant comprises a cement slurry with styrene-butadiene latex (e.g., as disclosed in U.S. Pat. No. 5,588,488 incorporated by reference herein in its entirety). Sealants may be utilized in setting expandable casing, which is further described hereinbelow. In other embodiments, the sealant is a cement utilized for primary or secondary wellbore cementing operations, as discussed further hereinbelow.

In embodiments, the sealant is cementitious and comprises a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of sealants are disclosed in U.S. Pat. Nos. 6,457,524; 7,077,203; and 7,174,962, each of which is incorporated herein by reference in its entirety. In an embodiment, the sealant comprises a sorel cement composition, which typically comprises magnesium oxide and a chloride or phosphate salt which together form for example magnesium oxychloride. Examples of magnesium oxychloride sealants are disclosed in U.S. Pat. Nos. 6,664,215 and 7,044,222, each of which is incorporated herein by reference in its entirety.

The wellbore composition (e.g., sealant) may include a sufficient amount of water to form a pumpable slurry. The water may be fresh water or salt water (e.g., an unsaturated aqueous salt solution or a saturated aqueous salt solution such as brine or seawater). In embodiments, the cement slurry may be a lightweight cement slurry containing foam (e.g., foamed cement) and/or hollow beads/microspheres. In an embodiment, the MEMS sensors are incorporated into or attached to all or a portion of the hollow microspheres. Thus, the MEMS sensors may be dispersed within the cement along with the microspheres. Examples of sealants containing microspheres are disclosed in U.S. Pat. Nos. 4,234,344; 6,457,524; and 7,174,962, each of which is incorporated herein by reference in its entirety. In an embodiment, the MEMS sensors are incorporated into a foamed cement such as those described in more detail in U.S. Pat. Nos. 6,063,738; 6,367,550; 6,547,871; and 7,174,962, each of which is incorporated by reference herein in its entirety.

In some embodiments, additives may be included in the cement composition for improving or changing the properties thereof. Examples of such additives include but are not limited to accelerators, set retarders, defoamers, fluid loss agents, weighting materials, dispersants, density-reducing agents, formation conditioning agents, lost circulation materials, thixotropic agents, suspension aids, or combinations thereof. Other mechanical property modifying additives, for example, fibers, polymers, resins, latexes, and the like can be added to further modify the mechanical properties. These additives may be included singularly or in combination. Methods for introducing these additives and their effective amounts are known to one of ordinary skill in the art.

In embodiments, the MEMS sensors are contained within a wellbore composition that forms a filtercake on the face of the formation when placed downhole. For example, various types of drilling fluids, also known as muds or drill-in fluids have been used in well drilling, such as water-based fluids, oil-based fluids (e.g., mineral oil, hydrocarbons, synthetic oils, esters, etc.), gaseous fluids, or a combination thereof. Drilling fluids typically contain suspended solids. Drilling fluids may form a thin, slick filter cake on the formation face that provides for successful drilling of the wellbore and helps prevent loss of fluid to the subterranean formation. In an embodiment, at least a portion of the MEMS remain associated with the filtercake (e.g., disposed therein) and may provide information as to a condition (e.g., thickness) and/or location of the filtercake. Additionally or in the alternative at least a portion of the MEMS remain associated with drilling fluid and may provide information as to a condition and/or location of the drilling fluid.

In embodiments, the MEMS sensors are contained within a wellbore composition that when placed downhole under suitable conditions induces fractures within the subterranean formation. Hydrocarbon-producing wells often are stimulated by hydraulic fracturing operations, wherein a fracturing fluid may be introduced into a portion of a subterranean formation penetrated by a wellbore at a hydraulic pressure sufficient to create, enhance, and/or extend at least one fracture therein. Stimulating or treating the wellbore in such ways increases hydrocarbon production from the well. In some embodiments, the MEMS sensors may be contained within a wellbore composition that when placed downhole enters and/or resides within one or more fractures within the subterranean formation. In such embodiments, the MEMS sensors provide information as to the location and/or condition of the fluid and/or fracture during and/or after treatment. In an embodiment, at least a portion of the MEMS remain associated with a fracturing fluid and may provide information as to the condition and/or location of the fluid. Fracturing fluids often contain proppants that are deposited within the formation upon placement of the fracturing fluid therein, and in an embodiment a fracturing fluid contains one or more proppants and one or more MEMS. In an embodiment, at least a portion of the MEMS remain associated with the proppants deposited within the formation (e.g., a proppant bed) and may provide information as to the condition (e.g., thickness, density, settling, stratification, integrity, etc.) and/or location of the proppants. Additionally or in the alternative at least a portion of the MEMS remain associated with a fracture (e.g., adhere to and/or retained by a surface of a fracture) and may provide information as to the condition (e.g., length, volume, etc.) and/or location of the fracture. For example, the MEMS sensors may provide information useful for ascertaining the fracture complexity.

In embodiments, the MEMS sensors are contained in a wellbore composition (e.g., gravel pack fluid) which is employed in a gravel packing treatment, and the MEMS may provide information as to the condition and/or location of the wellbore composition during and/or after the gravel packing treatment. Gravel packing treatments are used, inter alia, to reduce the migration of unconsolidated formation particulates into the wellbore. In gravel packing operations, particulates, referred to as gravel, are carried to a wellbore in a subterranean producing zone by a servicing fluid known as carrier fluid. That is, the particulates are suspended in a carrier fluid, which may be viscosified, and the carrier fluid is pumped into a wellbore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the wellbore. When installing the gravel pack, the gravel is carried to the formation in the form of a slurry by mixing the gravel with a viscosified carrier fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the wellbore. In an embodiment, the wellbore servicing composition (e.g., gravel pack fluid) comprises a carrier fluid, gravel and one or more MEMS. In an embodiment, at least a portion of the MEMS remain associated with the gravel deposited within the wellbore and/or formation (e.g., a gravel pack/bed) and may provide information as to the condition (e.g., thickness, density, settling, stratification, integrity, etc.) and/or location of the gravel pack/bed.

In various embodiments, the MEMS may provide information as to a location, flow path/profile, volume, density, temperature, pressure, or a combination thereof of a sealant composition, a drilling fluid, a fracturing fluid, a gravel pack fluid, or other wellbore servicing fluid in real time such that the effectiveness of such service may be monitored and/or adjusted during performance of the service to improve the result of same. Accordingly, the MEMS may aid in the initial performance of the wellbore service additionally or alternatively to providing a means for monitoring a wellbore condition or performance of the service over a period of time (e.g., over a servicing interval and/or over the life of the well). For example, the one or more MEMS sensors may be used in monitoring a gas or a liquid produced from the subterranean formation. MEMS present in the wellbore and/or formation may be used to provide information as to the condition (e.g., temperature, pressure, flow rate, composition, etc.) and/or location of a gas or liquid produced from the subterranean formation. In an embodiment, the MEMS provide information regarding the composition of a produced gas or liquid. For example, the MEMS may be used to monitor an amount of water produced in a hydrocarbon producing well (e.g., amount of water present in hydrocarbon gas or liquid), an amount of undesirable components or contaminants in a produced gas or liquid (e.g., sulfur, carbon dioxide, hydrogen sulfide, etc. present in hydrocarbon gas or liquid), or a combination thereof.

In embodiments, the data sensors added to the wellbore composition, e.g., sealant slurry, etc., are passive sensors that do not require continuous power from a battery or an external source in order to transmit real-time data. In embodiments, the data sensors are micro-electromechanical systems (MEMS) comprising one or more (and typically a plurality of) MEMS devices, referred to herein as MEMS sensors. MEMS devices are well known, e.g., a semiconductor device with mechanical features on the micrometer scale. MEMS embody the integration of mechanical elements, sensors, actuators, and electronics on a common substrate. In embodiments, the substrate comprises silicon. MEMS elements include mechanical elements which are movable by an input energy (electrical energy or other type of energy). Using MEMS, a sensor may be designed to emit a detectable signal based on a number of physical phenomena, including thermal, biological, optical, chemical, and magnetic effects or stimulation. MEMS devices are minute in size, have low power requirements, are relatively inexpensive and are rugged, and thus are well suited for use in wellbore servicing operations.

In embodiments, the MEMS sensors added to a wellbore servicing fluid may be active sensors, for example powered by an internal battery that is rechargeable or otherwise powered and/or recharged by other downhole power sources such as heat capture/transfer and/or fluid flow, as described in more detail herein.

In embodiments, the data sensors comprise an active material connected to (e.g., mounted within or mounted on the surface of) an enclosure, the active material being liable to respond to a wellbore parameter, and the active material being operably connected to (e.g., in physical contact with, surrounding, or coating) a capacitive MEMS element. In various embodiments, the MEMS sensors sense one or more parameters within the wellbore. In an embodiment, the parameter is temperature. Alternatively, the parameter is pH. Alternatively, the parameter is moisture content. Still alternatively, the parameter may be ion concentration (e.g., chloride, sodium, and/or potassium ions). The MEMS sensors may also sense well cement characteristic data such as stress, strain, or combinations thereof. In embodiments, the MEMS sensors of the present disclosure may comprise active materials that respond to two or more measurands. In such a way, two or more parameters may be monitored.

In addition or in the alternative, a MEMS sensor incorporated within one or more of the wellbore compositions disclosed herein may provide information that allows a condition (e.g., thickness, density, volume, settling, stratification, etc.) and/or location of the composition within the subterranean formation to be detected.

Suitable active materials, such as dielectric materials, that respond in a predictable and stable manner to changes in parameters over a long period may be identified according to methods well known in the art, for example see, e.g., Ong, Zeng and Grimes. "A Wireless, Passive Carbon Nanotube-based Gas Sensor," IEEE Sensors Journal, 2, 2, (2002) 82-88; Ong, Grimes, Robbins and Singl, "Design and application of a wireless, passive, resonant-circuit environmental monitoring sensor," Sensors and Actuators A, 93 (2001) 33-43, each of which is incorporated by reference herein in its entirety. MEMS sensors suitable for the methods of the present disclosure that respond to various wellbore parameters are disclosed in U.S. Pat. No. 7,038,470 B1 that is incorporated herein by reference in its entirety.

In embodiments, the MEMS sensors are coupled with radio frequency identification devices (RFIDs) and can thus detect and transmit parameters and/or well cement characteristic data for monitoring the cement during its service life. RFIDs combine a microchip with an antenna (the RFID chip and the antenna are collectively referred to as the "transponder" or the "tag"). The antenna provides the RFID chip with power when exposed to a narrow band, high frequency electromagnetic field from a transceiver. A dipole antenna or a coil, depending on the operating frequency, connected to the RFID chip, powers the transponder when current is induced in the antenna by an RF signal from the transceiver's antenna. Such a device can return a unique identification "ID" number by modulating and re-radiating the radio frequency (RF) wave. Passive RF tags are gaining widespread use due to their low cost, indefinite life, simplicity, efficiency, ability to identify parts at a distance without contact (tether-free information transmission ability). These robust and tiny tags are attractive from an environmental standpoint as they require no battery. The MEMS sensor and RFID tag are preferably integrated into a single component (e.g., chip or substrate), or may alternatively be separate components operably coupled to each other. In an embodiment, an integrated, passive MEMS/RFID sensor contains a data sensing component, an optional memory, and an RFID antenna, whereby excitation energy is received and powers up the sensor, thereby sensing a present condition and/or accessing one or more stored sensed conditions from memory and transmitting same via the RFID antenna.

In embodiments, MEMS sensors having different RFID tags, i.e., antennas that respond to RF waves of different frequencies and power the RFID chip in response to exposure to RF waves of different frequencies, may be added to different wellbore compositions. Within the United States, commonly used operating bands for RFID systems center on one of the three government assigned frequencies: 125 kHz, 13.56 MHz or 2.45 GHz. A fourth frequency, 27.125 MHz, has also been assigned. When the 2.45 GHz carrier frequency is used, the range of an RFID chip can be many meters. While this is useful for remote sensing, there may be multiple transponders within the RF field. In order to prevent these devices from interacting and garbling the data, anti-collision schemes are used, as are known in the art. In embodiments, the data sensors are integrated with local tracking hardware to transmit their position as they flow within a wellbore composition such as a sealant slurry.

The data sensors may form a network using wireless links to neighboring data sensors and have location and positioning capability through, for example, local positioning algorithms as are known in the art. The sensors may organize themselves into a network by listening to one another, therefore allowing communication of signals from the farthest sensors towards the sensors closest to the interrogator to allow uninterrupted transmission and capture of data. In such embodiments, the interrogator tool may not need to traverse the entire section of the wellbore containing MEMS sensors in order to read data gathered by such sensors. For example, the interrogator tool may only need to be lowered about half-way along the vertical length of the wellbore containing MEMS sensors. Alternatively, the interrogator tool may be lowered vertically within the wellbore to a location adjacent to a horizontal arm of a well, whereby MEMS sensors located in the horizontal arm may be read without the need for the interrogator tool to traverse the horizontal arm. Alternatively, the interrogator tool may be used at or near the surface and read the data gathered by the sensors distributed along all or a portion of the wellbore. For example, sensors located a distance away from the interrogator (e.g., at an opposite end of a length of casing or tubing) may communicate via a network formed by the sensors as described previously.

Generally, a communication distance between MEMS sensors varies with a size and/or mass of the MEMS sensors. However, an ability to suspend the MEMS sensors in a wellbore composition and keep the MEMS sensors suspended in the wellbore composition for a long period of time, which may be important for measuring various parameters of a wellbore composition throughout a volume of the wellbore composition, generally varies inversely with the size of the MEMS sensors. Therefore, sensor communication distance requirements may have to be adjusted in view of sensor suspendability requirements. In addition, a communication frequency of a MEMS sensor generally varies with the size and/or mass of the MEMS sensor.

In embodiments, the MEMS sensors are ultra-small, e.g., 3 $mm^2$, such that they are pumpable in a sealant slurry. In embodiments, the MEMS device is approximately 0.01 mm$^2$ to 1 mm$^2$, alternatively 1 mm$^2$ to 3 mm$^2$, alternatively 3 mm$^2$ to 5 mm$^2$, or alternatively 5 mm$^2$ to 10 mm$^2$. In embodiments, the data sensors are capable of providing data throughout the cement service life. In embodiments, the data sensors are capable of providing data for up to 100 years. In an embodiment, the wellbore composition comprises an amount of MEMS effective to measure one or more desired parameters. In various embodiments, the wellbore composition comprises an effective amount of MEMS such that sensed readings may be obtained at intervals of about 1 foot, alternatively about 6 inches, or alternatively about 1 inch, along the portion of the wellbore containing the MEMS. In an embodiment, the MEMS sensors may be present in the wellbore composition in an amount of from about 0.001 to about 10 weight percent. Alternatively, the MEMS may be present in the wellbore composition in an amount of from about 0.01 to about 5 weight percent. In embodiments, the sensors may have dimensions (e.g., diameters or other dimensions) that range from nanoscale, e.g., about 1 to 1000 nm (e.g., NEMS), to a micrometer range, e.g., about 1 to 1000 μm (e.g., MEMS), or alternatively any size from about 1 nm to about 1 mm. In embodiments, the MEMS sensors may be present in the wellbore composition in an amount of from about 5 volume percent to about 30 volume percent.

In various embodiments, the size and/or amount of sensors present in a wellbore composition (e.g., the sensor loading or concentration) may be selected such that the resultant wellbore servicing composition is readily pumpable without damaging the sensors and/or without having the sensors undesirably settle out (e.g., screen out) in the pumping equipment (e.g., pumps, conduits, tanks, etc.) and/or upon placement in the wellbore. Also, the concentration/loading of the sensors within the wellbore servicing fluid may be selected to provide a sufficient average distance between sensors to allow for networking of the sensors (e.g., daisy-chaining) in embodiments using such networks, as described in more detail herein. For example, such distance may be a percentage of the average communication distance for a given sensor type. By way of example, a given sensor having a 2 inch communication range in a given wellbore composition should be loaded into the wellbore composition in an amount that the average distance between sensors in less than 2 inches (e.g., less than 1.9, 1.8, 1.7, 1.6, 1.5, 1.4, 1.3, 1.2, 1.1, 1.0, etc. inches). The size of sensors and the amount may be selected so that they are stable, do not float or sink, in the well treating fluid. The size of the sensor could range from nano size to microns. In some embodiments, the sensors may be nanoelectromechanical systems (NEMS), MEMS, or combinations thereof. Unless otherwise indicated herein, it should be understood that any suitable micro and/or nano sized sensors or combinations thereof may be employed. The embodiments disclosed herein should not otherwise be limited by the specific type of micro and/or nano sensor employed unless otherwise indicated or prescribed by the functional requirements thereof, and specifically NEMS may be used in addition to or in lieu of MEMS sensors in the various embodiments disclosed herein.

In embodiments, the MEMS sensors comprise passive (remain unpowered when not being interrogated) sensors energized by energy radiated from a data interrogation tool. The data interrogation tool may comprise an energy transceiver sending energy (e.g., radio waves) to and receiving signals from the MEMS sensors and a processor processing the received signals. The data interrogation tool may further comprise a memory component, a communications component, or both. The memory component may store raw and/or processed data received from the MEMS sensors, and the communications component may transmit raw data to the processor and/or transmit processed data to another receiver, for example located at the surface. The tool components (e.g., transceiver, processor, memory component, and communications component) are coupled together and in signal communication with each other.

In an embodiment, one or more of the data interrogator components may be integrated into a tool or unit that is temporarily or permanently placed downhole (e.g., a downhole module), for example prior to, concurrent with, and/or subsequent to placement of the MEMS sensors in the wellbore. In an embodiment, a removable downhole module comprises a transceiver and a memory component, and the downhole module is placed into the wellbore, reads data from the MEMS sensors, stores the data in the memory component, is removed from the wellbore, and the raw data is accessed. Alternatively, the removable downhole module may have a processor to process and store data in the memory component, which is subsequently accessed at the surface when the tool is removed from the wellbore. Alternatively, the removable downhole module may have a communications component to transmit raw data to a processor and/or transmit processed data to another receiver, for example located at the surface. The communications component may communicate via wired or wireless communications. For example, the downhole component may communicate with a component or other node on the surface via a network of MEMS sensors, or cable or other communications/telemetry device such as a radio frequency, electromagnetic telemetry device or an acoustic telemetry device. The removable downhole component may be intermittently positioned downhole via any suitable conveyance, for example wire-line, coiled tubing, straight tubing, gravity, pumping, etc., to monitor conditions at various times during the life of the well.

In embodiments, the data interrogation tool comprises a permanent or semi-permanent downhole component that remains downhole for extended periods of time. For example, a semi-permanent downhole module may be retrieved and data downloaded once every few months or years. Alternatively, a permanent downhole module may remain in the well throughout the service life of well. In an embodiment, a permanent or semi-permanent downhole module comprises a transceiver and a memory component, and the downhole module is placed into the wellbore, reads data from the MEMS sensors, optionally stores the data in the memory component, and transmits the read and optionally stored data to the surface. Alternatively, the permanent or semi-permanent downhole module may have a processor to process and sensed data into processed data, which may be stored in memory and/or transmit to the surface. The permanent or semi-permanent downhole module may have a communications component to transmit raw data to a processor and/or transmit processed data to another receiver, for example located at the surface. The communications component may communicate via wired or wireless communications. For example, the downhole component may communicate with a component or other node on the surface via a network of MEMS sensors, or a cable or other communications/telemetry device such as a radio frequency, electromagnetic telemetry device or an acoustic telemetry device.

In embodiments, the data interrogation tool comprises an RF energy source incorporated into its internal circuitry and the data sensors are passively energized using an RF antenna, which picks up energy from the RF energy source.

In an embodiment, the data interrogation tool is integrated with an RF transceiver. In embodiments, the MEMS sensors (e.g., MEMS/RFID sensors) are empowered and interrogated by the RF transceiver from a distance, for example a distance of greater than 10 m, or alternatively from the surface or from an adjacent offset well. In an embodiment, the data interrogation tool traverses within a casing in the well and reads MEMS sensors located in a wellbore servicing fluid or composition, for example a sealant (e.g., cement) sheath surrounding the casing, located in the annular space between the casing and the wellbore wall. In embodiments, the interrogator senses the MEMS sensors when in close proximity with the sensors, typically via traversing a removable downhole component along a length of the wellbore comprising the MEMS sensors. In an embodiment, close proximity comprises a radial distance from a point within the casing to a planar point within an annular space between the casing and the wellbore. In embodiments, close proximity comprises a distance of 0.1 m to 1 m. Alternatively, close proximity comprises a distance of 1 m to 5 m. Alternatively, close proximity comprises a distance of from 5 m to 10 m. In embodiments, the transceiver interrogates the sensor with RF energy at 125 kHz and close proximity comprises 0.1 m to 5 m. Alternatively, the transceiver interrogates the sensor with RF energy at 13.5 MHz and close proximity comprises 0.05 m to 0.5 m. Alternatively, the transceiver interrogates the sensor with RF energy at 915 MHz and close proximity comprises 0.03 m to 0.1 m. Alternatively, the transceiver interrogates the sensor with RF energy at 2.4 GHz and close proximity comprises 0.01 m to 0.05 m.

In embodiments, the MEMS sensors incorporated into wellbore cement and used to collect data during and/or after cementing the wellbore. The data interrogation tool may be positioned downhole prior to and/or during cementing, for example integrated into a component such as casing, casing attachment, plug, cement shoe, or expanding device. Alternatively, the data interrogation tool is positioned downhole upon completion of cementing, for example conveyed downhole via wireline. The cementing methods disclosed herein may optionally comprise the step of foaming the cement composition using a gas such as nitrogen or air. The foamed cement compositions may comprise a foaming surfactant and optionally a foaming stabilizer. The MEMS sensors may be incorporated into a sealant composition and placed downhole, for example during primary cementing (e.g., conventional or reverse circulation cementing), secondary cementing (e.g., squeeze cementing), or other sealing operation (e.g., behind an expandable casing).

In embodiments, MEMS sensors having one or more identifiers associated therewith may be included in the wellbore servicing composition. By way of non-limiting example, one or more types of RFID tags, e.g., comprising an RFID chip and antenna, may be added to wellbore servicing fluids. The RFID tag allows the RFID chip on the MEMS sensor to power up in response to exposure to RF waves of a narrow frequency band and modulate and re-radiate these RF waves, thereby providing information concerning electrical characteristics and responses of the RFID tags, as described herein.

If a data interrogation unit in a vicinity of the MEMS sensor generates an electromagnetic field in the narrow frequency band of the RFID tag, then the MEMS sensor can transmit sensor data to the data interrogator, and the data interrogator can determine that a MEMS sensor having a specific RFID tag is in the vicinity of the data interrogator. A data interrogation unit can also determine properties of fluids by receiving information about electrical characteristics of RFID tags, as described herein. Again, while various RFID embodiments are disclosed herein, any suitable technology compatible with and integrated into the MEMS sensors may be employed to allow the MEMS sensors to convey information, e.g., one or more identifiers and/or sensed parameters, to one or more interrogation units.

In embodiments, MEMS sensors having a first characteristic (e.g., an RFID tag that has a first resonant frequency under a first set of conditions) may be added to/suspended in all or a portion of a first wellbore servicing fluid, and MEMS sensors having a second characteristic (e.g., an RFID tag that has a second resonant frequency under a second set of conditions) may be added to/suspended in all or a portion of a second wellbore servicing fluid. The first and second wellbore servicing fluids may be added consecutively to a wellbore in which a casing having regularly longitudinally spaced data interrogation units attached thereto is situated. As the first and second wellbore servicing fluids travel through the wellbore, the data interrogation units interrogate the respective MEMS sensors of the fluids, thereby obtaining data regarding the characteristics associated with the MEMS sensor (e.g., the type or resonant frequency of RFID tag) and/or at least one wellbore parameter such as a position of the MEMS sensors in the wellbore or other sensed parameter (e.g., temperature, pressure, etc.). As a result, in an embodiment, the positions of the different types of MEMS sensor (e.g., different types of RFID tags such as "A" tags and "B" tags) suspended in the two wellbore servicing fluids may be determined. In addition, using the aggregated positions of the MEMS sensors having the same and/or different type of RFID tag, a volume occupied by the first and/or second wellbore servicing fluids in the wellbore at a specific time and/or location in the wellbore may be determined. In addition, a property such as conductivity, pressure, temperature, etc. of the first and/or second wellbore servicing fluids can be determined based on resonant frequency or shift in expected resonant frequency of RFID tags disposed in the fluids.

Figure 2:
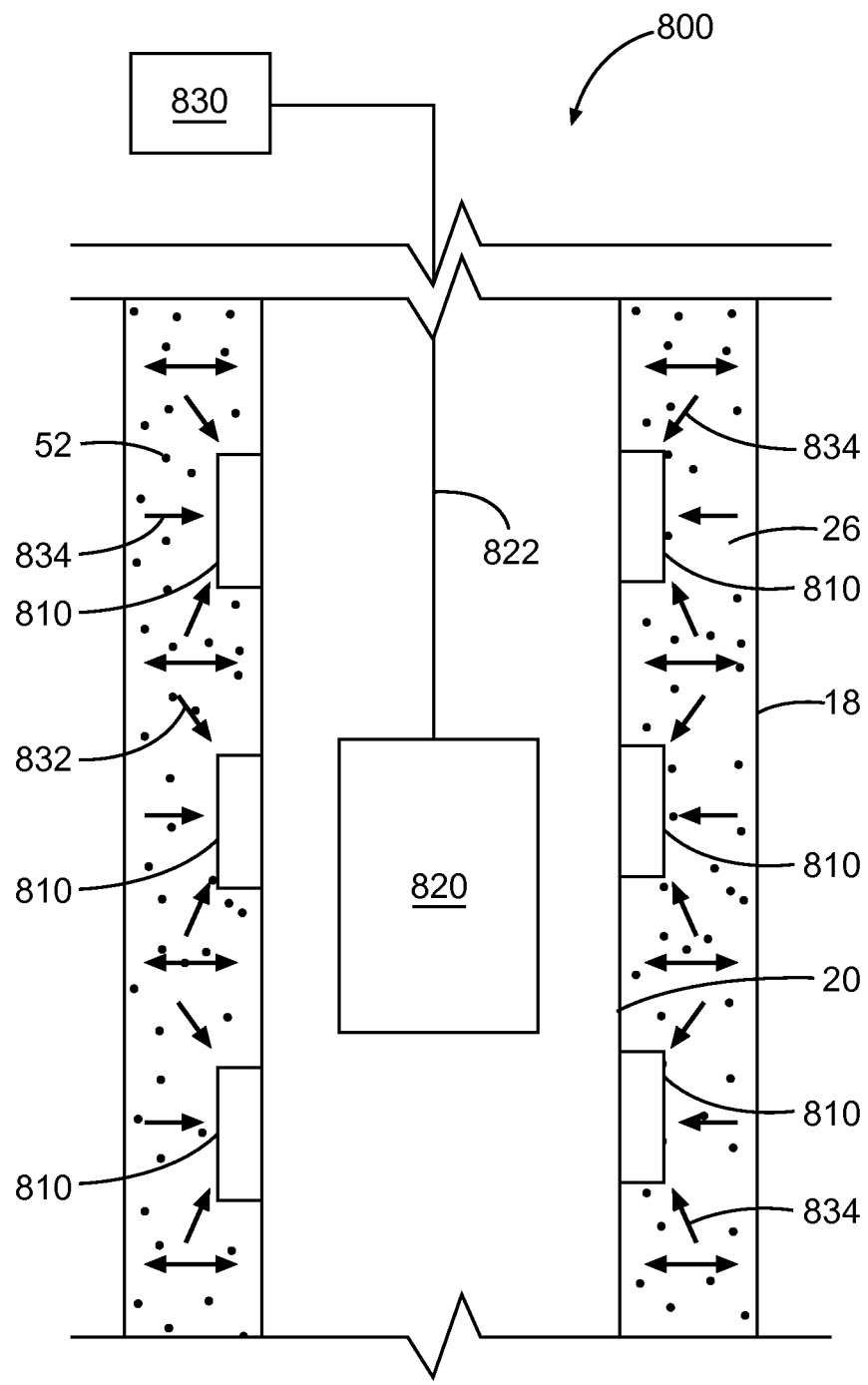
FIG. 2 is a schematic view of an embodiment of a wellbore parameter sensing system.

Referring to FIG. 2, a schematic view of an embodiment of a wellbore parameter sensing system 800 is illustrated. The wellbore parameter sensing system 800 may comprise the wellbore 18, inside which the casing 20 is situated. In an embodiment, the wellbore parameter sensing system 800 may further comprise a plurality of regional communication units 810, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In embodiments, the regional communication units 810 may be situated on or in casing collars that couple casing joints together. In addition, the regional communication units 610 may be situated in an interior of the casing 20, on an exterior of the casing 20, or both. In an embodiment, the wellbore parameter sensing system 800 may further comprise a tool (e.g., a data interrogator 620 or other data collection and/or power-providing device), which may be lowered down into the wellbore 18 on a wireline 822, as well as a processor 830 or other data storage or communication device, which is connected to the data interrogator 820.

In an embodiment, each regional communication unit 810 may be configured to interrogate and/or receive data from, MEMS sensors 52 situated in the annulus 26, in the vicinity of the regional communication unit 810. The MEMS sensors 52 may be configured to transmit MEMS sensor data to neighboring MEMS sensors 52, as denoted by double arrows 832, as well as to transmit MEMS sensor data to the regional communication units 810 in their respective vicinities, as denoted by single arrows 834. In an embodiment, the MEMS sensors 52 may be passive sensors that are powered by bursts of electromagnetic radiation from the regional communication units 810. In a further embodiment, the MEMS sensors 52 may be active sensors that are powered by batteries situated in or on the MEMS sensors 52 or by other downhole power sources.

The data interrogator 820 may be lowered into the wellbore 18 for the purpose of interrogating regional communication units 810 and receiving the MEMS sensor data stored in the regional communication units 810. Furthermore, the data interrogator 820 may be configured to transmit the MEMS sensor data to the processor 830, which processes the MEMS sensor data. In an embodiment, a fluid containing MEMS in contained within the wellbore casing, and the data interrogator 820 is conveyed through such fluid and into communicative proximity with the regional communication units 810. In various embodiments, the data interrogator 820 may communicate with, power up, and/or gather data directly from the various MEMS sensors distributed within the annulus 26 and/or the casing 20, and such direct interaction with the MEMS sensors may be in addition to or in lieu of communication with one or more of the regional communication units 810. For example, if a given regional communication unit 810 experiences an operational failure, the data interrogator 820 may directly communicate with the MEMS within the given region experiencing the failure, and thereby serve as a backup (or secondary/verification) data collection option.

Sensing Wellbore Conditions Using RFID Tag Characteristics

In some embodiments, regional interrogation units 810, or data interrogator 820, will generate interrogation frequencies at baseline resonant frequencies of inductive-capacitive (LC) circuits associated with MEMS sensors. Further, interrogation units 810, or data interrogator 820 will generate additional interrogation frequencies at a range of other values based on anticipated shifts of resonant frequencies caused by changes in these LC circuits based on varying properties of fluids downhole.

As noted above regarding FIG. 1, MEMS RFID tags can be useful for monitoring wellbore conditions by sensing properties of wellbore fluids. Various embodiments provide MEMS sensors that include RFID tags with electrical response characteristics that vary with fluid properties of fluids containing those RFID tags. A data interrogation tool 810 (FIG. 2) or other tool such as a regional communication unit 820 can then remotely measure these electrical response characteristics and use these characteristics to determine conductivity or other properties of fluids. Some embodiments described herein may include passive RFID tags that receive power from RF energy transferred from the interrogator tool or other tool. However, embodiments are not limited thereto and active tags (powered e.g., by internal batteries) can be used.

Figure 3A:
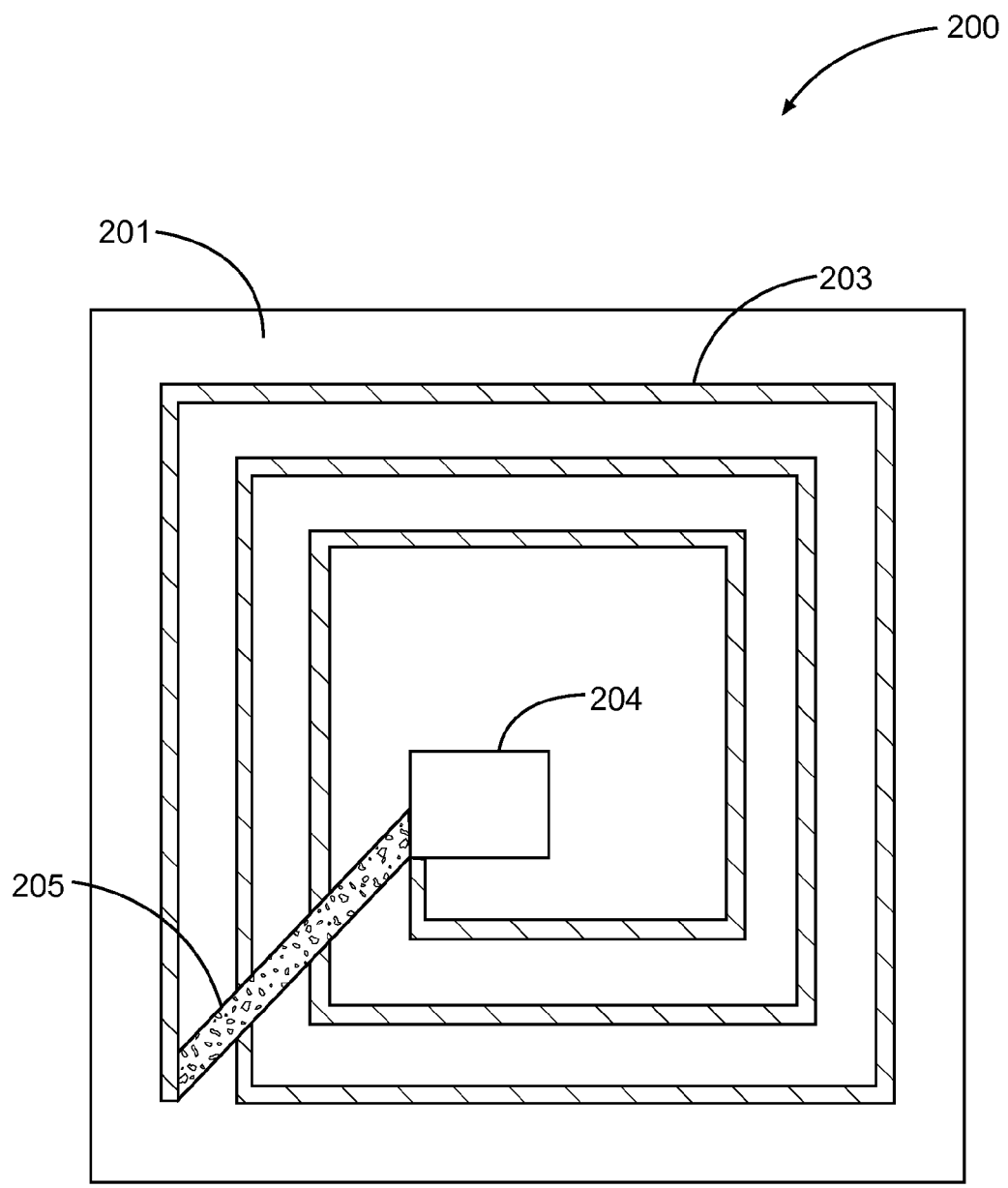
FIG. 3A is a top view of a layout of a RFID tag in accordance with some embodiments.

FIG. 3A is a top view of a layout of an RFID tag 200 in accordance with some embodiments. The example RFID tag 200 can be fabricated with conventional integrated circuit and/or MEMS technologies on substrate 201 with dicing streets between adjacent RFID tags (not shown in FIG. 3A) cleared of materials that can crack during dicing. RFID tag 200 will include at least one inductive-capacitive (LC) circuit, including inductor 203 and capacitor 204, with a resonant frequency. Substrate 201 will include an electrically insulating material such as quartz, fused silica, sapphire, or polymeric material. In this example, RFID tag 200 is a passive tag, that basically creates an dip in an interrogation signal thereby indicating the tag's presence to a RFID interrogator.

An outer end of inductor 203 will connect to capacitor 204 through a metal trace 205. Inductor 203 will serve functions of an antenna for communicating with, for example, an interrogation tool 810 or regional communication unit 820 (FIG. 2). Inductor 203 will be fabricated with a conductor, such as copper, e.g., for example deposited copper with thickness of two or more skin depths, formed in a generally two-dimensional expanding coil (or helix) originating at a central location, at the resonant frequency. In the depicted example, the helix is squared to fit within a generally rectangular form factor. In other examples, the inductor may expand in a two dimensional coil in a generally circular form, or in another form that may be desired.

Metal trace 205 will include metal to minimize resistance and can be of any appropriate thickness, for example, in some examples, about 1-2 micrometers thick. Metal trace 205 will connect a lower electrode (not shown in FIG. 3A) of capacitor 204 to substrate 201. The lower electrode of capacitor 204 will be the electrode of capacitor 204 that is closest to substrate 201. Inductor 203 will connect to the upper electrode (not shown in FIG. 3A) of capacitor 204. Capacitor 204 will be enclosed entirely inside the innermost turn of inductor 203. Capacitor 204 can include a silicon oxide dielectric or other dielectric as described herein.

Figure 3B:
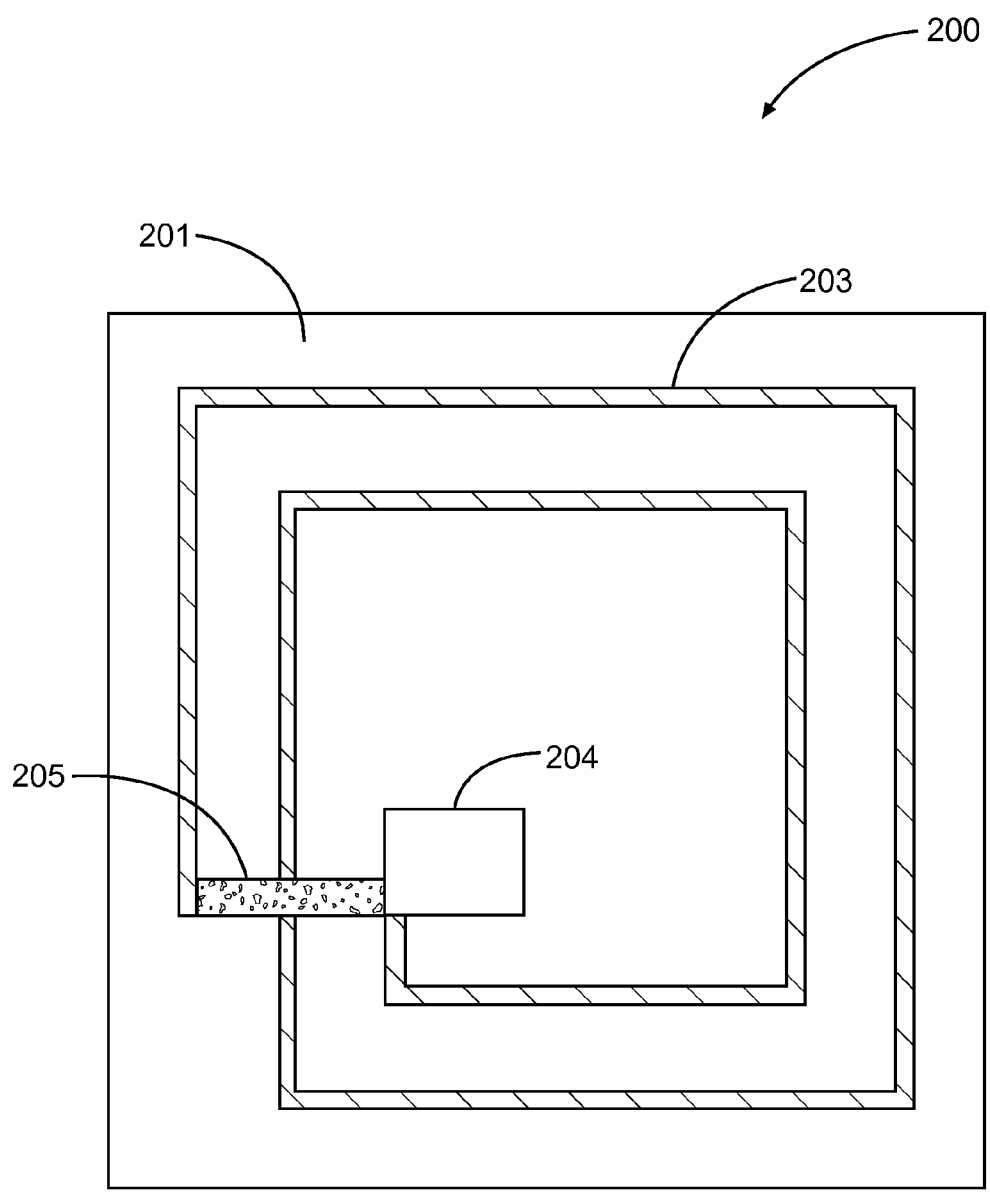
FIG. 3B is a top view of a layout of another RFID tag in accordance with other embodiments.

FIG. 3B is a top view of a layout of an RFID tag 200 in accordance with other embodiments. As shown in FIG. 3B, inductor 203 can be configured such that the outer end terminates in line with capacitor 204 location so that the length of metal trace 205 is reduced relative to the length of metal trace 205 shown in FIG. 3A. The example RFID tag 200 of FIG. 3B can exhibit a reduced level of losses (e.g., parasitics), and therefore a higher quality factor (e.g., high "Q") as described herein, relative to an RFID tag 200 arranged as in FIG. 3A at least partially because of the reduced length of metal trace 205 can lead to reduced resistance losses in metal trace 205.

Sensing Dielectric Properties Using RFID Tags

The resonant frequency f of an LC circuit, such as an LC circuit that can be included on RFID tag 200, can be calculated according to:

$$f = \frac{1}{2\pi\sqrt{LC}} \qquad (1)$$

where L is inductance (in Henrys) and C is capacitance (in Farads) of the inductor and capacitor, respectively, of the LC circuit. In some embodiments, the resonant frequency of an LC circuit for RFID tags 200 will be in the range of 200-800 MHz.

Figure 4:
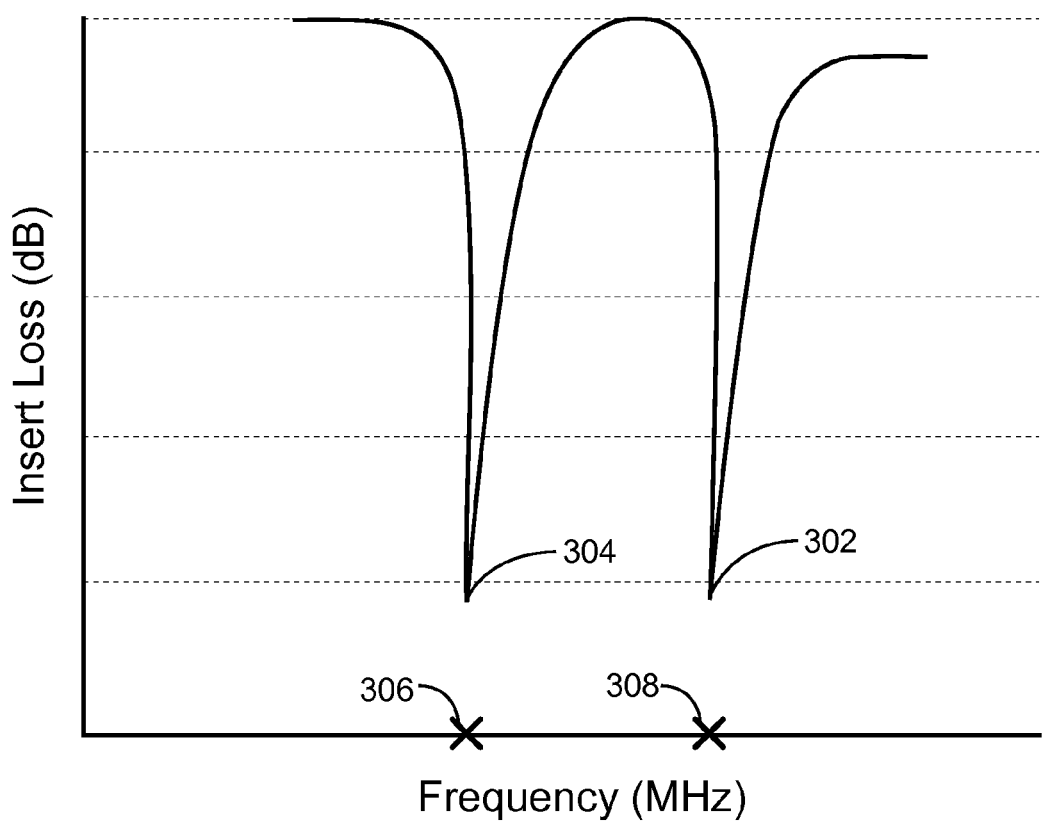
FIG. 4 illustrates an example shift of resonant frequency in accordance with some embodiments.

The resonant frequency f of an LC circuit can shift to a lower frequency when an RFID tag 200 including that LC circuit is placed in a fluid with high polarity (e.g., water). FIG. 4 illustrates an example shift of resonant frequency in accordance with some embodiments. FIG. 4 illustrates insertion loss, as a function of frequency, of RFID tag 200 as measured remotely at an interrogation tool 820 or regional communication unit 810. When RFID tag 200 is interrogated at a resonant frequency of an LC circuit on RFID tag 200, insertion loss experiences a transition (e.g., dip, or transition zero) at the appropriate frequency.

For illustrative purposes, FIG. 4 shows a portion of an example insertion loss curve 302 for an RFID tag with resonant frequency 308 if RFID tag 200 were in a medium such as air, for example.

However, in various embodiments, RFID tag 200 will be disposed in a fluid, for example water or a substance with a percentage water content. In that circumstance, RFID tag 200 can have portion of an insertion loss curve similar to curve 304, with resonant frequency 306. Interrogation tool 820 or regional communication unit 810 will provide an interrogation signal at one or more possible resonant frequencies of an LC circuit of RFID tag 200. If an RFID tag 200 with one of those resonant frequencies is present within a distance of interrogation tool 820 or regional communication unit 810, interrogation tool 820 or regional communication unit 810 will measure a resonant frequency at, for example, resonant frequency 306. While two resonant frequencies 306 and 308 are shown, embodiments are not limited thereto. As described herein, RFID tag 200 can include a plurality of LC circuits, each with a resonant frequency that interrogation tool 820 or regional communication unit 810 can measure as described herein regarding FIG. 4.

Based on the measured resonant frequency a processor, for example processor 830 or a processor of regional communication unit 810, can determine that RFID tag 200 has been placed in water or another aqueous fluid, or within a material mixed with some percentage of water or other aqueous fluid, for example. This determination may be made downhole through use of the processor in comparing the detected frequency dip to a look-up table. In other examples, the detected frequency dip information (and/or the entire detected response curve), will be sent to the surface for more detailed analysis.

Furthermore, an interrogation tool can measure the frequency width (e.g., bandwidth BW) of the resonance based on Q according to:

$$BW = \frac{\omega_0}{Q} \quad (2)$$

where $\omega_0$ is a measured resonant frequency of RFID tag 200 in radians per second and is related to resonant frequency f (Equation (1)) according to $\omega_0=2\pi f$ and Q is determined based on inductance and capacitance values of an LC circuit of RFID tag 200 according to Equation (4) herein.

This bandwidth BW varies with conductivity of the fluid, generally increasing with increased conductivity, and therefore conductivity of the fluid can be inferred from the measured bandwidth, again for example through use of a look-up table.

Figure 5:
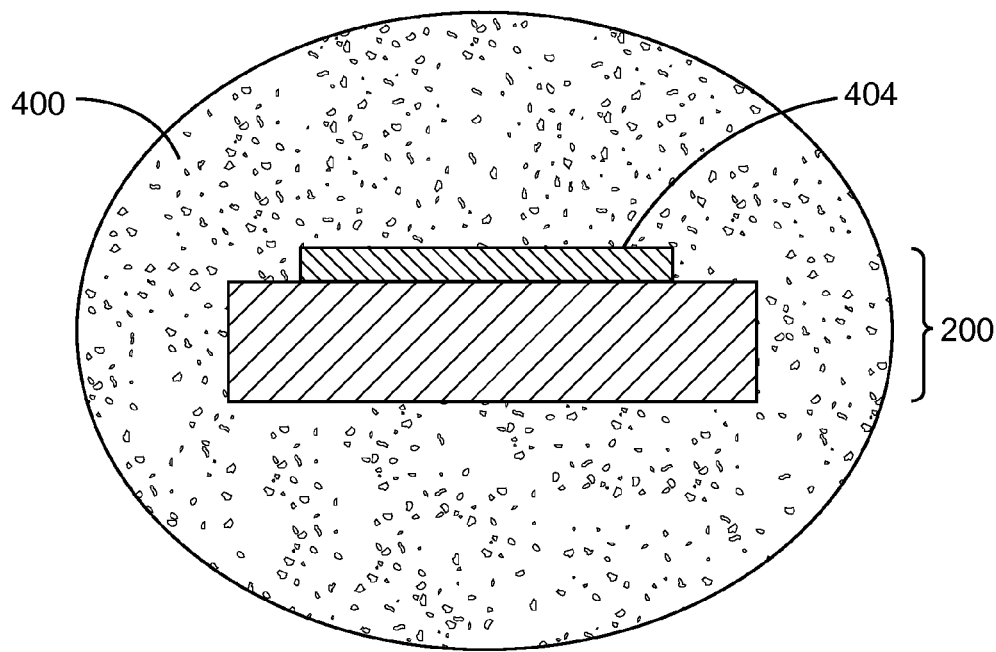
FIG. 5 is a side view of an RFID tag enclosed in an encapsulant in accordance with some embodiments.

In some embodiments, encapsulant properties of RFID tag 200 can be adjusted to control, limit, or adapt RFID tag 200 responses in various fluids. FIG. 5 is a side view of RFID tag 200 enclosed in an encapsulant 400 in accordance with some embodiments.

In some embodiments, a thinly covered RFID tag 200 (e.g., an RFID tag encapsulated in material about 100 micrometers thick), can exhibit a frequency shift in water of about 15-30% of the center frequency of the resonance. The resonant frequency will typically shift downward relative to the typical resonant frequency of an LC circuit 404 of RFID tag 200 and the bandwidth of RFID tag 200 response may broaden (e.g., the Q may decrease). Interrogation tool 810 or regional communication assembly 820 can measure the resonant frequency as described herein regarding FIG. 4 to calculate and monitor fluid properties.

In some embodiments, encapsulant 400 of RFID tag 200 can be used to control the extent to which the resonant frequency of that LC circuit 404 of RFID tag 200 will shift with changing dielectric properties (e.g. conductivity) of fluids proximate RFID tag 200. In an embodiment, encapsulant 400 can have a thickness (more than 200 micrometers) such that the changing dielectric properties of fluids do not alter the center frequency or resonance width of RFID tag 200, to allow for a stable RFID tag 200 resonant frequency and bandwidth.

In some embodiments, RFID tag may be constructed to have multiple LC circuits (indicated at 404, and as discussed in more detail in reference to FIGS. 8A-D)), and encapsulant 400 of RFID tag 200 can have varying thicknesses over different LC circuits of RFID tag 200. For example, encapsulant 400 can be of a first thickness to prevent one LC circuit's resonant frequency from varying with fluid dielectric properties, and encapsulant 400 can be of a second thickness (e.g., a lesser thickness than the first thickness) to allow another LC circuit's resonant frequency to vary with fluid dielectric properties.

In some embodiments, encapsulant 400 is sufficiently thick to protect RFID tag 200 from physical damage in the wellbore environment (>50 micrometers) but still sufficiently thin (<1000 micrometers) that RFID tag 200 resonant frequency and bandwidth will vary with varying fluid dielectric properties.

In some embodiments, encapsulant 400 is chosen to have dielectric properties that vary with external fluid pH, ionic concentration, temperature, or conductivity. Possible encapsulant 400 additives include hydration sensitive materials, amphiphilic materials, and polypeptide complexes. Encapsulant 400 additives should be such that dielectric constant of encapsulant 400 changes with the amount of water or other fluid present, but such that the material does not chemically react with the water or other fluid. As example materials, the encapsulant may be, or may include, a porous dielectric and/or a glass frit, such that the well servicing fluids will not chemically react with the encapsulant but the bulk conductivity and the dielectric properties shift in response to the presence of the surrounding fluids, and the type and degree of shift is a function of the electrical (e.g., dielectric) properties of such fluids. The change in dielectric properties of encapsulant 400 causes a corresponding shift in resonant frequency of LC 404 circuit of RFID tag 200 that in turn is sensed by an interrogation tool that interrogates RFID tag 200 at least at the shifted resonant frequency.

In some embodiments, RFID tag 200 can include two layers of encapsulant 400 (not shown in FIG. 5). A first (e.g., outer) layer can be thick enough to protect RFID tag 200 from physical damage. The outer layer may act as a sacrificial layer to abrade or partially abrade from RFID tag 200 to expose at least a portion of a second (e.g., inner) layer that will permit intrusion by fluid, or pressure or temperature caused by fluids proximate a surface of the inner layer.

Sensing Environmental Parameters Using RFID Tags

RFID tag 200 can sense various environmental parameters, for example pressure, temperature or other parameters of surrounding fluids, based on changes these environmental parameters generate in, for example, capacitance or resistance of LC circuit 404. An interrogation tool 810 or regional communication unit 820 can then monitor variation of resonant parameters of RFID tag 200, such as resonant frequency, to calculate the relevant environmental parameter. The resonant frequency can be altered according to Equation (1) by changing the capacitance value (e.g., C of Equation (1)) of capacitor 204.

Figure 6:
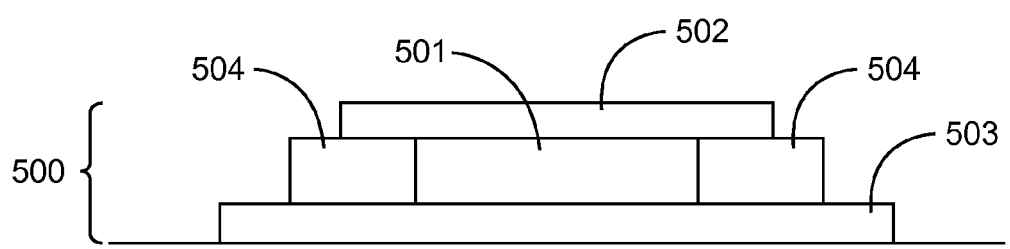
FIG. 6 illustrates a side view of a capacitor that can form a part of an RFID tag for sensing pressure or temperature in accordance with some embodiments.

FIG. 6 illustrates a side view of a capacitor 500 that can form a part of RFID tag 200 for sensing pressure or temperature in accordance with some embodiments. Capacitor 500 can be operable to serve as capacitor 204 of RFID tag 200 (FIG. 3A-3B).

In various embodiments, RFID tag 200 can sense pressure if at least some portion of capacitor dielectric 501 is composed of a compressible medium such as air. In an embodiment, capacitor 500 can include an air bridge capacitor in which dielectric 501 includes air, and posts 504 include a rigid insulator, for example a dielectric material such as a silicon dioxide or a polymer. Top electrode 502 will be in spaced relation to bottom electrode 503. In preferred configurations, top electrode 502 and bottom electrode 503 can be generally planar, and for example, rectangular in shape, and supported by posts 504 relative to one side of the rectangle, and thus top electrode 502 is cantilevered over bottom electrode 503.

In these embodiments, when top electrode 502 (e.g., conductive plate) experiences an increase in pressure, top electrode 502 is deflected toward bottom electrode 503. In a parallel plate capacitive element such as capacitor 500, capacitance is inversely proportional to the separation distance between electrodes and therefore the reduced distance between top electrode 502 and bottom electrode 503 increases the capacitance value of the capacitor 500. The increase in capacitance of capacitor 500 decreases the resonant frequency according to Equation (1). In at least these embodiments, RFID tag 200 will be encapsulated in a compressible material that can transmit pressure, such as resilient epoxy.

In some embodiments, RFID tag 200 can sense temperature. In these embodiments, capacitor dielectric 501 will expand with temperature according to a thermal coefficient of expansion of dielectric 501 material. Accordingly, an increase in temperature could be sensed due to the increased separation between top electrode 502 and bottom electrode 501. The change in capacitance will cause a corresponding change, as shown in Equation (1), in resonant frequency of the corresponding LC circuit 404 of RFID tag 200. In at least these embodiments, capacitor dielectric 301 will not be mechanically compressible or compliant, such that capacitor dielectric 501 does not compress with pressure. Accordingly, an RFID tag 200 with a capacitor dielectric 501 that expands with temperature will not be sensitive, or will be less sensitive, to pressure changes than will an RFID tag 200 that includes a compressible capacitor dielectric 501. For example, the encapsulant could be a porous dielectric or glass frit as described above, and in some examples a deformable coating will be applied proximate the circuitry (for example to a moveable capacitor plate), the coating having a lower Young's modulus facilitating the deformation. An example material for such a coating is a Benzocyclobutene (BCB) material.

Temperature can also be sensed based on a variation of the relative dielectric constant, $\in_r$, as a function of temperature. Capacitance of capacitor 300 can be written as:

$$C = \varepsilon_0 \varepsilon_r \frac{A}{d} \quad (3)$$

where C is capacitance in Farads, A is the area of overlap of top electrode 502 and bottom electrode 501, $\in_r$ is the dielectric constant of dielectric 501, $\in_0$ is the electric constant (8.854×10$^{12}$Fm$^{-1}$) and d is the distance between top electrode 502 and bottom electrode 501.

Accordingly, variations in $\in_r$ as a function of temperature will vary the capacitance of RFID tag 200 and therefore the resonant frequency of RFID tag 200. In at least these embodiments, dielectric 501 can include a hydrophilic material.

In another embodiment, top electrode 502 can include a bilayer including at least two different materials, at least one material being electrically conductive, with different thermal coefficients of expansion. As the temperature is varied, the two materials of top electrode 502 will expand or contract at different rates to produce an arc or bow in top electrode 502 toward or away from bottom electrode 503 thus changing the distance between top electrode 502 and bottom electrode 503. This change in distance can produce a change in capacitance according to Equation (3) and a corresponding change in resonant frequency according to Equation (1).

In another embodiment, capacitor 500 can include an air bridge capacitor in which dielectric 501 includes air and posts 504 include a rigid insulator, and top electrode 502 and bottom electrode 503 include a single metal (e.g., not a bilayer) in order to sense pressure rather than temperature. In at least these embodiments, top electrode 502 and bottom electrode 503 will move together or apart with changing pressure.

In yet another embodiment, capacitor 500 can include a cantilever structure (not shown in FIG. 6) in which one of posts 504 is removed. The corresponding end of top electrode 502 will be in spaced relation to bottom electrode 503 and top electrode 502 will be unencumbered from moving vertically based on, for example, changes in pressure or on changes in temperature. Top electrode 502 may exhibit a greater range of motion in a cantilever arrangement relative to the air bridge arrangement described herein. Accordingly, capacitance of capacitor 500 may change to a greater degree for smaller changes in pressure when top electrode 502 is in a cantilever arrangement than when top electrode 502 is in an air bridge arrangement with both posts 504 present.

Referring again to FIGS. 3A and 3B, in some embodiments, a portion of inductor 203 or metal trace 205 can be at least partially composed of a conductive element, for example Nichrome, that has an electrical resistivity that changes as a function of temperature. As the resistance of the temperature-dependent conductive element varies, the Q of the LC circuit of RFID tag 200 will change.

Q, as understood by one skilled in the art, is a dimensionless parameter that characterizes a resonator's (e.g., LC circuit of RFID tag 200) bandwidth relative to its center frequency. In an ideal series RLC circuit, Q can be expressed according to Equation 4:

$$Q = \frac{1}{R}\sqrt{\frac{L}{C}} \quad (4)$$

Equation (4) can also be expressed as:

$$Q = \frac{\omega_0 L}{R} \quad (5)$$

In equations (4) and (5), R, L, and C are the resistance, inductance and capacitance, respectively, of the LC circuit of RFID tag 200 and $\omega_0$, is the resonant frequency of the LC circuit of RFID tag 200.

Accordingly, increasing resistance R of the conductive element in inductor 204 or metal trace 205 will lower the Q of the LC circuit of RFID tag 200. Interrogation tool 810 or regional communication unit 820 can measure the temperature seen by an RFID tag 200 by comparing measured Q with the intrinsic Q of the LC circuit at resonant angular frequency $\omega_0$ of RFID tag 200.

In some embodiments, conductive elements can be used for inductor 203 or metal trace 205, and a temperature- or pressure-sensing capacitor 204 can additionally be used. Processors in, for example an interrogation tool 810, regional communication unit 820 or surface processor 830 can measure temperature based on change in Q in a RFID tag 200 while at the same time measuring pressure or temperature based on a shift in resonant frequency of RFID tag 200.

While equations (4) and (5) define Q for an ideal series RLC circuit, one skilled in the art will appreciate that parasitic losses, for example generated by undesired capacitances internal to various circuit elements, or by undesired inductance between circuit elements, can reduce Q values below those that would be calculated according to equations (4) and (5).

Multi-Tag and Multi-LC Circuit Embodiments

In some embodiments, two or more RFID tags can be placed in proximity to each other, within an encapsulant, so that the resonant frequencies of the tags interact. An interrogation tool can monitor the interaction to detect pressure, temperature, conductivity, etc.

Figure 7:
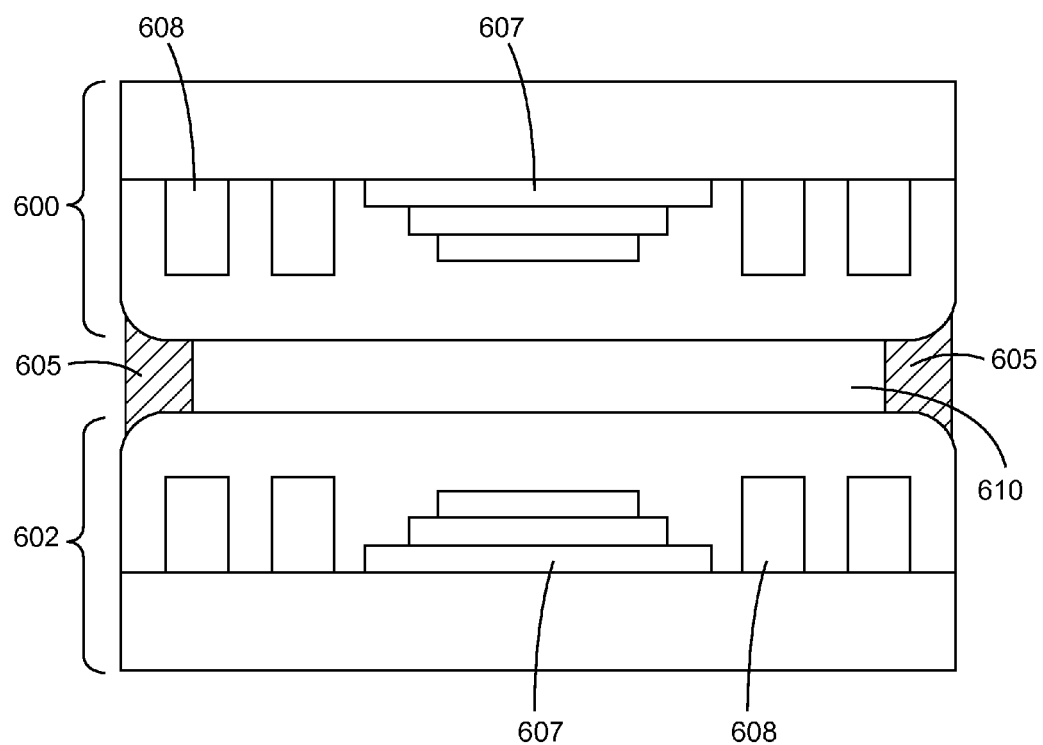
FIG. 7 illustrates an apparatus including two RFID tags placed in proximity in accordance with some embodiments.

FIG. 7 illustrates an apparatus including two RFID tags 600 and 602, including LC circuits including capacitors 607 and inductors 608, placed in proximity in accordance with some embodiments. By providing an air gap 610 between RFID tags 600 and 602 and adjusting spacing between RFID tags 600 and 602, the amount of interaction between the RFID tags 600 and 602 can change, altering the resulting resonant frequencies. Changes in pressure can alter the spacing or thermal expansion changes in standoffs 605 can alter the spacing.

In some embodiments, a plurality of LC circuits are used on one or more of RFID tags 600 and 602, each responding differently or similarly to fluid conditions. In some embodiments, one of the plurality of LC circuits can be substantially isolated, so that the resonant frequency of that LC circuit does not vary or varies only minimally, such that the LC circuit can be the means by which the tag is identified. Other LC circuits of the plurality of LC circuits on that RFID tag 600 or 602 can be used for measuring fluid conditions when an interrogation tool 810 or regional communication unit 820 interrogates RFID tag 600 or 602 at resonant frequencies of the plurality of LC circuits as described herein.

Furthermore, using a plurality of LC circuits on an RFID tag 600 or 602 can increase the tag detection range by increasing the magnitude of response of the combined RFID tag 600 and 602. Generally, the greater the distance of an RFID tag 600 from a sensor assembly such as regional communication unit 810, the less of a response will be seen. However, combining a plurality of LC circuits on a RFID tag 600 or 602 can increase the magnitude of response thereby increasing the detection distance.

FIGS. 8A-8D illustrate configurations of an RFID tag 801 that include a plurality of LC circuits 704 in accordance with some embodiments. Depending on the proximity of the LC circuits 704 to each other, the proximal coupling and effect on RFID tag resonant frequency and bandwidth can be weak or strong.

In some embodiments, die substrates 704 are fabricated with LC circuits 702 attached thereon that have substantially the same resonant frequency and bandwidth when measured separately. In another embodiments die substrates 704 are fabricated with LC circuits 702 attached thereon that have different resonant frequencies and bandwidths when measured separately but the same resonant frequency and bandwidth when the tag is measured as a unified tag. In at least those embodiments, tag detection range can be increased because the overall magnitude of RFID tag 801 response to an interrogation frequency is increased.

Figure 8A:
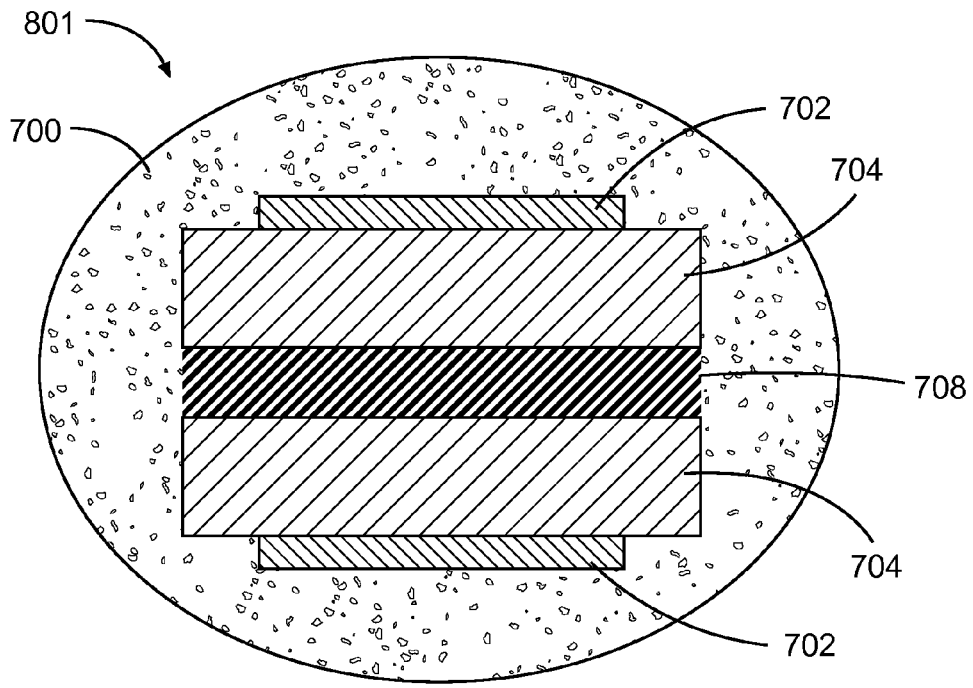
FIG. 8A illustrates a multi-die RFID tag arranged in a back-to-back arrangement in accordance with some embodiments.

FIG. 8A illustrates a multi-die RFID tag 801 in accordance with some embodiments. RFID tag 801 can be operable as RFID tag 200 (FIG. 3A-3B). In FIG. 8A, two die substrates 704 are arranged "back-to-back" with attachment material 708 disposed between die substrates 704. In some embodiments, no such layer will be necessary, as the substrates may be bonded together without use of a separate material layer (as at 708), or as addressed below, the LC circuits 702 may be placed on opposite sides of a single substrate 704. However, embodiments are not limited to a back-to-back arrangement, and die substrates 704 can be arranged in a front-to-front arrangement (FIG. 8B), a front-to-back arrangement (FIG. 8C) or in multiple arrangements or combinations involving three or more dies (FIG. 8D). An LC circuit 702 (e.g., a frequency-selective element) is attached to a surface of each die substrate 704. Encapsulant 700 can have properties as described herein, and may include a variety of materials as described herein.

Additionally, while the use of two separate die coupled in generally fixed relation to one another is convenient for many manufacturing operations, multiple RFID LC circuits 702 may also be formed on a single substrate. In some embodiments, a die substrate 704 could have a first LC circuit 702 formed on a front surface and another LC circuit 702 formed on the opposite surface of the substrate 704. Such a device would appear similar to the schematic illustration of FIG. 8A, but would include only a single substrate layer 704 (and thus no attachment layer 708), with LC circuits on opposite sides of that single substrate layer 704. Of course, multiple LC circuits can be formed on either side (or both sides) of a substrate layer 704.

In some embodiments, a die substrate 704 could have an LC circuit 704 attached to a front surface, the LC circuit 702 may have disposed thereon a dielectric insulating layer, and a second LC circuit 702 can be attached to, or formed on, the dielectric insulating layer.

Figure 8B:
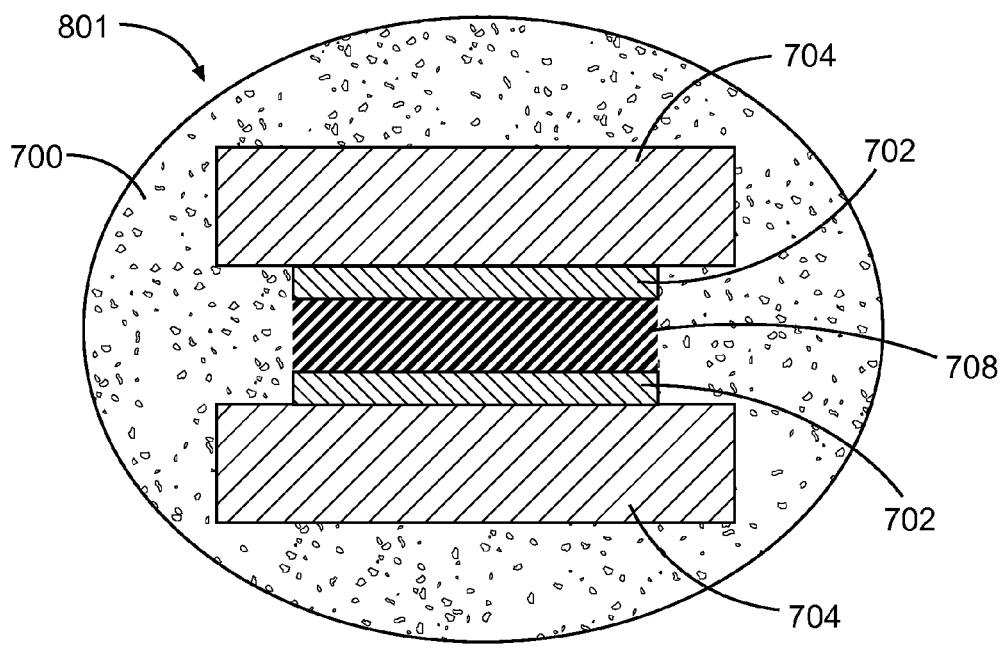
FIG. 8B illustrates a multi-die RFID tag arranged in a front-to-front arrangement accordance with some embodiments.
Figure 8C:
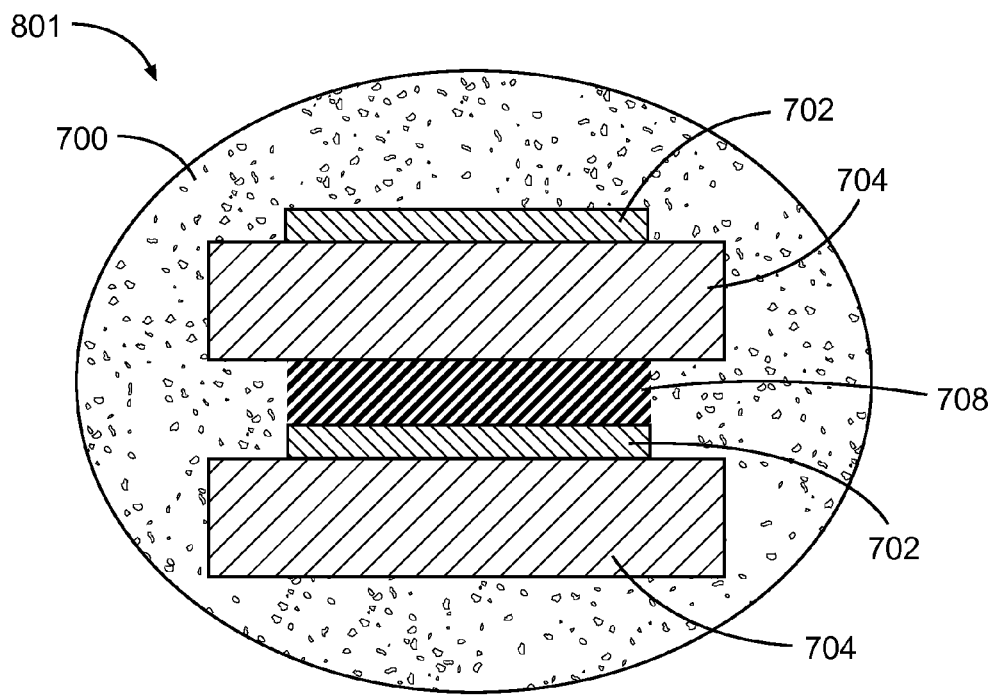
FIG. 8C illustrates a multi-die RFID tag arranged in a front-to-back arrangement accordance with some embodiments.
Figure 8D:
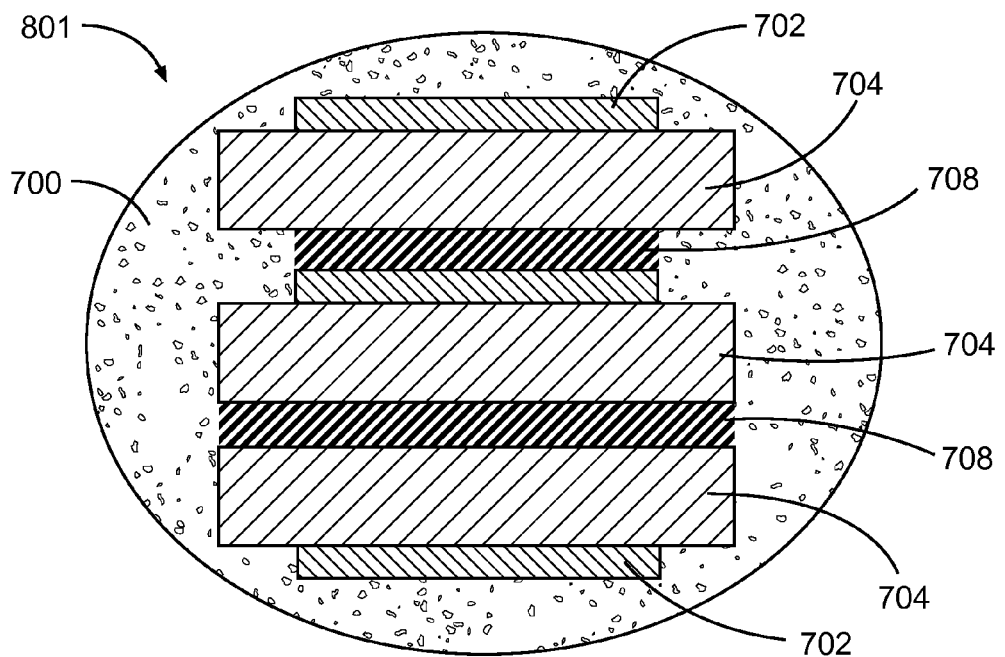
FIG. 8D illustrates an RFID tag including three die in accordance with some embodiments.

In any of the embodiments illustrated in FIG. 8A-8B, LC circuits 702 can have varying values for inductance and capacitance and therefore varying resonant frequencies. An interrogation tool 810 or regional communication unit 820 can interrogate RFID tags 801 at any or all of these resonant frequencies to detect properties of fluids in a wellbore.

In summary, using the apparatus, systems, and methods disclosed herein can provide indications of conditions downhole, and in particular can provide information regarding dielectric properties and pressure and temperature of fluids downhole. These and other properties can be measured and continually monitored by interrogating RFID tags at appropriate frequencies, where signal responses of RFID tags shift based on varying conditions of downhole fluids.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

What is claimed is:

1. A radio frequency identification (RFID) tag of a plurality of radio frequency identification (RFID) tags for disposing in a borehole environment, wherein the borehole environment comprising:
   a casing string having a communication assembly supported by the casing string, wherein the communication assembly is configured to obtain information associated with the radio frequency identification (RFID) tags in an annulus surrounding the casing string when the casing string is in place within a borehole, wherein the RFID tag comprising:
   a first die attached to a first inductive-capacitive (LC) circuit including a first capacitive element coupled to a first inductive element, the first LC circuit having a first resonant frequency; and
   a first coating material disposed around the first die to form a first outer surface of the RFID tag, the first coating material having a first thickness over a portion of the first LC circuit, the first coating material configured to permit a conductivity property of a fluid proximate the first outer surface to affect the first resonant frequency of the first LC circuit such that the first resonant frequency shifts to a second resonant frequency, wherein
   the first capacitive element includes a top electrode, a bottom electrode, and a dielectric layer between the top electrode and the bottom electrode, the dielectric layer including a material having a Young's modulus within a range to maintain elastic behavior of the material having the Young's modulus when the first capacitive element is in operation,
   a compressibility property of the first coating material is such that pressure of the fluid proximate the first outer surface generates a change in a distance between the top electrode and the bottom electrode to generate a proportionate change in a capacitive value of the first capacitive element, and
   a second LC circuit including a second capacitive element coupled to a second inductive element, wherein the first coating material has a second thickness over a portion of the second LC circuit, the second thickness being different from the first thickness, the second thickness being such that the conductivity property of the fluid proximate the first outer surface does not affect a third resonant frequency of the second LC circuit; and
   a processor configured to receive data indicative of the second resonant frequency and to determine a property of the fluid based on the second resonant frequency.

2. The RFID tag of claim 1, wherein the second LC circuit is formed on a second die, and wherein the second die is attached to the first die.

3. The RFID tag of claim 2, wherein the third resonant frequency of the second LC circuit is substantially equal to the first resonant frequency.

4. The RFID tag of claim 3, wherein the RFID tag has an increased read range compared to a tag having only a single die and a single LC circuit.

5. The RFID tag of claim 1, wherein dielectric layer between the top electrode and the bottom electrode, the dielectric layer further including a material having a coefficient of thermal expansion such that a change in temperature of the fluid proximate the first outer surface generates a change in a distance between the top electrode and the bottom electrode to generate a proportionate change in a capacitive value of the first capacitive element.

6. The RFID tag of claim 5, wherein the dielectric layer is non-compressible.

7. The RFID tag of claim 5, wherein the top electrode includes a plurality of metal layers.

8. The RFID tag of claim 7, wherein the plurality of metal layers includes a copper layer.

9. The RFID tag of claim 1, further comprising a second coating material, different from the first coating material, disposed around the first coating material to reduce abrasion effects on the RFID tag.

10. A system comprising:
    a casing string having a communication assembly supported by the casing string, wherein the communication assembly is configured to obtain information associated with a first plurality of radio frequency identification (RFID) tags in an annulus surrounding the casing string when the casing string is in place within a borehole; and
    the first plurality of RFID tags placed within a first fluid pumped into the annulus, each of the first plurality of RFID tags including,
        a die attached to an inductive-capacitive (LC) circuit, the LC circuit having a first resonant frequency and a first capacitive element, the first capacitive element includes a top electrode, a bottom electrode, and a dielectric layer between the top electrode and the bottom electrode, the dielectric layer including a material having a Young's modulus within a range to maintain elastic behavior of the material having the Young's modulus when the first capacitive element is in operation, and
        a coating material disposed around the die to form an outer surface, the coating material having a first thickness to permit a conductivity property of the first fluid to affect the first resonant frequency such that the first resonant frequency shifts to a shifted second resonant frequency, the coating material further having a compressibility property such that pressure of the first fluid proximate the outer surface generates a change in a distance between the top electrode and the bottom electrode to generate a proportionate change in a capacitive value of the first capacitive element;

wherein at least one of the first plurality of RFID tags further includes a second LC circuit including a second capacitive element coupled to a second inductive element, wherein the coating material further having a second thickness over a portion of the second LC circuit, the second thickness being different from the first thickness, the second thickness being such that the conductivity property of the first fluid proximate the outer surface does not affect a third resonant frequency of the second LC circuit; and a processor configured to receive data indicative of the shifted second resonant frequency and to determine a property of the first fluid based on the shifted second resonant frequency.

11. The system of claim 10, further comprising a second plurality of RFD tags configured differently from the first plurality of RFD tags and placed within the first fluid to detect another property of the first fluid.

12. The system of claim 10, wherein the communication assembly further includes a plurality of RFID sensor assemblies, each RFID sensor assembly of the RFID sensor assemblies arranged on the communication assembly to interrogate the first plurality of RFID tags within a selected azimuthal region of the annulus.

13. The system of claim 12, further comprising:
a memory device operably coupled to the processor, the memory device having stored thereon values representative of first resonant frequencies for each of the first plurality of RFID tags and expected shifted second resonant frequencies for each of the first plurality of RFID tags; and wherein
said each RFID sensor assembly includes oscillator circuitry in communication with the memory and the processor to provide interrogation frequencies, retrieved from the memory, to interrogate the first plurality of RFID tags within the selected azimuthal region of the annulus.

14. A method for monitoring wellbore conditions, the method comprising:
associating a sensor assembly with an exterior of a casing string being placed in a borehole, wherein the sensor assembly is configured to communicate with a plurality of radio frequency identification device (RFID) tags in an annulus surrounding the casing string when the casing string is in place within the borehole;
pumping a fluid into the annulus, the fluid containing the plurality of RFID tags, each of the plurality of RFID tags having a respective first inductive-capacitive (LC) circuit with a first intrinsic resonant frequency, a first capacitive element of the first LC circuit including a top electrode, a bottom electrode, and a dielectric layer between the top electrode and the bottom electrode, the dielectric layer including a material having a Young's modulus within a range to maintain elastic behavior of the material having the Young's modulus when the first capacitive element is in operation, the plurality of RFID tags having an associated set of shifted resonant frequencies to which the first intrinsic resonant frequency shifts responsive to properties of the fluid, said each of the plurality of RFID tags further including a coating material disposed around the respective first LC circuit and having an outer surface, the coating material having a first thickness to permit a conductivity property of the fluid to affect the first intrinsic resonant frequency such that the first intrinsic resonant frequency shifts to a shifted resonant frequency, the coating material further having a compressibility property such that pressure of the fluid proximate the outer surface generates a change in a distance between the top electrode and the bottom electrode to generate a proportionate change in a capacitive value of the respective first LC circuit;

providing, by the sensor assembly, a plurality of interrogation frequencies, the plurality of interrogation frequencies including each shifted resonant frequency of the set of shifted resonant frequencies and the first intrinsic resonant frequency of each of the plurality of RFID tags; and detecting a property of the fluid upon receiving a signal with a first shifted resonant frequency of the set of shifted resonant frequencies, responsive to providing an interrogation frequency of the plurality of interrogation frequencies, from an RFID tag of the plurality of RFID tags, wherein at least one RFID tag of the plurality of RFID tags further includes a second LC circuit with a second intrinsic resonant frequency, a second capacitive element coupled to a second inductive element, wherein the coating material further having a second thickness over a portion of the second LC circuit, the second thickness being different from the first thickness, the second thickness being such that the conductivity property of the fluid proximate the outer surface does not affect the second intrinsic resonant frequency of the second LC circuit, and the method further comprises:

detecting the first intrinsic resonant frequency of the first LC circuit of said each RFID tag to detect a presence of the at least one RFID tag, and, subsequent to detecting the presence, estimating a shifted resonant frequency of the second LC circuit of the at least one RFID tag to detect the property of the fluid.

15. The method of claim 14, further comprising:
detecting another property of the fluid upon receiving a signal at a second shifted resonant frequency different from the first shifted resonant frequency.

* * * * *